United States Patent
Duluk, Jr. et al.

(10) Patent No.: US 6,552,723 B1
(45) Date of Patent: Apr. 22, 2003

(54) SYSTEM, APPARATUS AND METHOD FOR SPATIALLY SORTING IMAGE DATA IN A THREE-DIMENSIONAL GRAPHICS PIPELINE

(75) Inventors: Jerome F. Duluk, Jr., Palo Alto, CA (US); Jason R. Redgrave, Mountain View, CA (US); Sushma S. Trivedi, Sunnyvale, CA (US); Richard E. Hessel, Pleasanton, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/378,633

(22) Filed: Aug. 20, 1999

Related U.S. Application Data

(60) Provisional application No. 60/097,336, filed on Aug. 20, 1998.

(51) Int. Cl.[7] .............................................. G06T 17/00
(52) U.S. Cl. ...................................... 345/419; 345/421
(58) Field of Search ................................ 345/418, 419, 345/420, 431, 421, 422, 423, 424, 502

(56) References Cited

U.S. PATENT DOCUMENTS

| | | |
|---|---|---|
| 4,783,829 A | 11/1988 | Miyakawa et al. |
| 4,945,500 A | 7/1990 | Deering ...................... 364/522 |
| 4,970,636 A | 11/1990 | Snodgrass et al. .......... 364/518 |
| 5,083,287 A | 1/1992 | Obata et al. ................. 395/126 |
| 5,123,085 A | 6/1992 | Wells et al. |
| 5,402,532 A | 3/1995 | Epstein et al. ............... 395/122 |
| 5,448,690 A | 9/1995 | Shiraishi et al. |
| 5,455,900 A | 10/1995 | Shiraishi et al. |
| 5,481,669 A | 1/1996 | Poulton et al. |
| 5,574,836 A | 11/1996 | Broemmelsiek ............ 395/127 |
| 5,579,455 A | 11/1996 | Greene et al. |
| 5,596,686 A | 1/1997 | Duluk, Jr. |
| 5,664,071 A | 9/1997 | Nagashima |
| 5,684,939 A | 11/1997 | Foran et al. ................. 395/131 |
| 5,699,497 A | 12/1997 | Erdahl et al. |

(List continued on next page.)

OTHER PUBLICATIONS

Peercy et al. "Efficient bump mapping hardware" (Computer Graphics Proceedings, Annual Conference Series, 1997 pp. 303–306).

(List continued on next page.)

Primary Examiner—Cliff N. Vo
(74) Attorney, Agent, or Firm—Dorsey & Whitney LLP; R. Michael Ananian

(57) ABSTRACT

The present invention is a mid-pipeline sorting unit that sorts image data mid-pipeline in a tiled 3-D graphics pipeline architecture. The image data includes vertices of geometric primitives. The mid-pipeline sorting determines whether a geometric primitive intersects a region of a 2-D window. The 2-D window having been divided into multiple such regions. Upon determining which region of the 2-D window that the geometric primitive intersects, the mid-pipeline sorting unit stores the vertices that define the geometric primitive into a memory in a manner that associates each of the geometric primitive's vertices with the region that was intersected. After the image data is sorted into the memory, the mid pipeline sorting unit sends the sorted image data to the subsequent stage on a region by region basis.

Yet another embodiment of the present invention provides a guaranteed conservative memory estimate to the mid-pipeline sorting stage of whether there is enough free memory for the mid pipeline sorting unit to sort and store the image data.

Yet another embodiment of the present invention sends image data from a memory to a next stage in a graphics pipeline in a spatially staggered sequence.

32 Claims, 16 Drawing Sheets

U.S. PATENT DOCUMENTS

| | | | |
|---|---|---|---|
| 5,710,876 A | | 1/1998 | Peercy et al. ............... 395/126 |
| 5,767,589 A | | 6/1998 | Lake et al. |
| 5,767,859 A | | 6/1998 | Rossin et al. ............... 345/434 |
| 5,798,770 A | | 8/1998 | Baldwin |
| 5,828,378 A | | 10/1998 | Shiraishi ..................... 345/422 |
| 5,841,447 A | | 11/1998 | Drews |
| 5,850,225 A | | 12/1998 | Cosman |
| 5,854,631 A | | 12/1998 | Akeley et al. ............... 345/419 |
| 5,860,158 A | | 1/1999 | Pai et al. |
| 5,864,342 A | | 1/1999 | Kajiya et al. ............... 345/418 |
| RE36,145 E | | 3/1999 | DeAguiar et al. ........... 345/511 |
| 5,880,736 A | | 3/1999 | Peercy et al. ............... 345/426 |
| 5,889,997 A | | 3/1999 | Strunk |
| 5,920,326 A | | 7/1999 | Rentschler et al. .......... 345/503 |
| 5,949,424 A | | 9/1999 | Cabral et al. ............... 345/426 |
| 5,949,426 A | * | 9/1999 | Toelle et al. ................ 345/431 |
| 5,977,977 A | | 11/1999 | Kajiya et al. ............... 345/418 |
| 5,990,904 A | | 11/1999 | Griffin |
| 6,002,410 A | | 12/1999 | Battle |
| 6,002,412 A | | 12/1999 | Schinnerer |
| 6,118,452 A | * | 9/2000 | Gannett |
| 6,128,000 A | * | 10/2000 | Jouppi et al. |
| 6,167,486 A | * | 12/2000 | Lee et al. |
| 6,204,859 B1 | * | 3/2001 | Jouppi et al. |
| 6,229,553 B1 | * | 5/2001 | Duluk, Jr. et al. |
| 6,246,415 B1 | * | 6/2001 | Grossman et al. |
| 6,259,452 B1 | * | 7/2001 | Coorg et al. |

OTHER PUBLICATIONS

Lathrop "Rendering (converting a scene to pixels)", (The Way Computer Graphics Works, Wiley Computer Publishing, 1997, John Wiley & Sons, Inc., Chapter 7, pp. 93–150).

Foley et al. "Illumination and shading" (Computer Graphics Principles and Practice (2nd edition in C, Addison–Wesley Publishing Co. 1996, Chapter 16, pp. 721–814).

Watt "Reflection and illumination models" (3D Computer Graphics, 2nd edition, Addison–Wesley, 1993, pp. 89–126.

Watt, "3D Computer Graphics" (2nd ed.), Chapter 4, Reflection and Illumination Models, p. 89–126.

Foley et al., Computer Graphics—Principles and Practice (2nd ed. 1996), Chapter 16, Illumination and Shading, pp. 721–814.

Lathrop, "The Way Computer Graphics Works" (1997) Chapter 7, Rendering (Converting A Scene to Pixels), pp. 93–150.

Schilling et al., "Texram: a smart memory for texturing," IEEE computer graphics and applications, May 1996, 32–41.

Angel (interactive computer graphics: a top–down approach with Open G1: ISBN: 0–201–85571–2—sections 6.8 & 7.7.2).

* cited by examiner

SYSTEM, APPARATUS AND METHOD FOR SPATIALLY SORTING IMAGE DATA IN A THREE-DIMENSIONAL GRAPHICS PIPELINE

CROSS-REFERENCE TO RELATED APPLICATIONS

This application claims the benefit under 35 USC Section 119(e) of U.S. Provisional Patent Application Ser. No. 60/097,336 filed Aug. 20, 1998 and entitled GRAPHICS PROCESSOR WITH DEFERRED SHADING; which is hereby incorporated by reference.

This application also claims the benefit under 35 USC Section 120 of:

U.S. Ser. No. 09/213,990, filed Dec. 17, 1998, entitled HOW TO DO TANGENT SPACE LIGHTING IN A DEFERRED SHADING ARCHITECTURE;

Ser. No. 09/378,598, filed Aug. 20, 1999, entitled APPARATUS AND METHOD FOR PERFORMING SETUP OPERATIONS IN A 3-D GRAPHICS PIPELINE USING UNIFIED PRIMITIVE DESCRIPTORS;

Ser. No. 09/378,439 filed Aug. 20, 1999, entitled GRAPHICS PROCESSOR WITH PIPELINE STATE STORAGE AND RETRIEVAL;

Ser. No. 09/378,408, filed Aug. 20, 1999, entitled METHOD AND APPARATUS FOR GENERATING TEXTURE;

Ser. No. 09/379,144, filed Aug. 20, 1999 entitled APPARATUS AND METHOD FOR GEOMETRY OPERATIONS IN A 3D GRAPHICS PIPELINE;

Ser. No. 09/372,137, filed Aug. 20, 1999 entitled APPARATUS AND METHOD FOR FRAGMENT OPERATIONS IN A 3D GRAPHICS PIPELINE;

Ser. No. 09/378,637, filed Aug. 20, 1999, entitled DEFERRED SHADING GRAPHICS PIPELINE PROCESSOR; and Ser. No. 09/378,391, filed Aug. 20, 1999, entitled METHOD AND APPARATUS FOR PERFORMING CONSERVATIVE HIDDEN SURFACE REMOVAL IN A GRAPHICS PROCESSOR WITH DEFERRED SHADING;

Ser. No. 09/377,503, filed Aug. 20, 1999, entitled DEFERRED SHADING GRAPHICS PIPELINE PROCESSOR HAVING ADVANCED FEATURES; and Ser. No. 09/378,299, filed Aug. 20, 1999, entitled DEFERRED SHADING GRAPHICS PIPELINE PROCESSOR, now U.S. Pat. No. 6,229,553.

FIELD OF THE INVENTION

The present invention relates generally to a computer structure and method for processing three-dimensional ("3-D") computer graphics in a 3-D graphics processor. More particularly, the present invention is directed to a computer structure and method for spatially sorting image data with respect to regions of a 2-D window that is divided into multiple equally sized regions, wherein the image data is comprised of geometric primitives and/or mode information. Yet another embodiment of the present invention, provides an indication of whether enough free space is available in a memory to sort and store image data into the memory. Yet another embodiment of the present invention, balances the effects that horizon complexity and scene complexity can have on subsequent stages of a graphics pipeline by sending image data to a next stage in the pipeline in a spatially staggered sequence.

BACKGROUND

The art and science of three-dimensional ("3-D") computer graphics concerns the generation, or rendering, of two-dimensional ("2-D") images of 3-D objects for display or presentation onto a display device or monitor, such as a Cathode Ray Tube or a Liquid Crystal Display. The object may be a geometric primitive (hereinafter also referred to simply as a "primitive") such as a point, a line segment, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive must be processed through a series of operations, or processing stages in a graphics rendering pipeline. A generic pipeline is merely a series of cascading processing units, or stages wherein the output from a prior stage, serves as the input for a subsequent stage. In the context of a graphics processor, these stages include, for example, per-vertex operations, primitive assembly operations, pixel operations, texture assembly operations, rasterization operations, and fragment operations.

The details of the various processing stages, except where otherwise noted, are not necessary to practice the present invention, and for that reason, will not be discussed in greater detail. A summary of the common processing stages in a conventional rendering pipeline can be found in the following standard reference: "Fundamentals of Three-dimensional Computer Graphics", by Watt, Chapter 5: The Rendering Process, pages 97 to 113, published by Addison-Wesley Publishing Company, Reading, Mass., 1989, reprinted 1991, ISBN 0-201-15442-0, which is hereby incorporated by reference for background purposes only. Very few conventional graphics pipelines have tiled architectures. A tiled architecture is a graphic pipeline architecture that associates image data, and in particular geometry primitives, with regions in a 2-D window, where the 2-D window is divided into multiple equally size regions. Tiled architectures are beneficial because they allow a graphics pipeline to efficiently operate on smaller amounts of image data. In other words, a tiled graphics pipeline architecture presents an opportunity to utilize specialized, higher performance graphics hardware into the graphic pipeline.

Those graphics pipelines that do have tiled architectures do not perform mid-pipeline sorting of the image data with respect to the regions of the 2-D window. Conventional graphics pipelines typically sort image data either, in software at the beginning of a graphics pipelines, before any image data transformations have taken place, or in hardware the very end of the graphics pipeline, after rendering the image into a 2-D grid of pixels.

Significant problems are presented by sorting image data at the very beginning of the graphics pipelines. For example, sorting image data at the very beginning of the graphics pipelines, typically involves dividing intersecting primitives into smaller primitives where the primitives intersect, and thereby, creating more vertices. It is necessary for each of these vertices to be transformed into an appropriate coordinate space. Typically this is done by subsequent stage of the graphics pipeline.

Vertex transformation is computationally intensive. Because none of these vertices have yet been transformed into an appropriate coordinate space, each of these vertices will need to be transformed by a subsequent vertex transformation stage of the graphics pipeline into the appropriate coordinates space. Coordinate spaces are known. As noted above, vertex transformation is computationally intensive. Increasing the number of vertices by subdividing primitives before transformation, slows down the already slow vertex transformation process.

Significant problems are also presented by spatially sorting image data at the end of a graphics pipeline (in hardware). For example, sorting image data at the end of a graphic pipeline typically slows image processing down, because such an implementation typically "texture maps" and rasterizes image data that will never be displayed. To illustrate this, consider the following example, where a first piece of geometry is spatially located behind a second piece of opaque geometry. In this illustration, the first piece of geometry will never be displayed.

Another problem with spatially sorting image data at the end of the graphics pipeline is that such an implementation typically requires a larger data cache and/or more RAM to store the spatially sorted image data, because the texture mapped and rasterized image data needs to be stored before it is displayed, even if certain image data will not be seen. Therefore, what is needed is a structure and method for a spatially sorting image data that does not have the larger data cache and/or RAM footprints as required in existing art. To achieve this goal, an implementation must efficiently manage finite cache and memory by not texture mapping and rasterizing those image data that will not be displayed. Ideally, it is desirable to sort image data mid-pipeline, after image data coordinate transformations have taken place, and before the image data has been texture mapped and/or rasterized, it is also desirable to remove hidden pixels from the image data before the image data has been texture mapped and/or rasterized. Therefore, what is needed is a tiled graphics pipeline architecture that performs not only, mid-pipeline sorting, but mid-pipeline culling.

We will now discuss conventional graphics pipeline rendering resource balancing problems. Image data is typically sent from one stage of a graphics pipeline to another stage of the graphics pipeline in a row-by-row, or column-by-column manner, utilizing a first-in/first-out ("FIFO") strategy. Significant problems are presented by outputting image data to a next stage of a graphic pipeline in such a manner. For example, outputting image data on a FIFO basis does not take into account how scene complexity and/or horizon complexity across different portions of an image may place differing loads on subsequent stages of the graphics pipeline, and possibly result in less efficient pipeline processing. Scene complexity is the number of primitives in a portion of an image. Horizon complexity is the variation in the density of primitives near a horizon in the image.

To illustrate this problem, consider that an image (or a portion of an image) that has a low complexity (scene complexity or horizon complexity) requires a lesser amount of data to represent it, as compared to the greater amount of data required to represent an image (or portion of an image) that has a high complexity. If one stage of the graphics pipeline sends data representing an image having high complexity (a complexity that varies significantly over different parts of the image) on a FIFO basis to subsequent stages of the pipeline, the processing loads often will not be balanced across the different stages, resulting in a less efficient graphics pipeline.

An ideal graphics pipeline implies that data is distributed across various graphics pipeline stages in a balanced manner, such that the rendering resources of the graphics pipeline are efficiently utilized.

Many of today's 3-D graphics applications run on computers having interactive graphical user interface that include window managers. Such graphical user interfaces include, for example, Microsoft Widows 3.1, Windows 95, and Windows 98. While using such an graphics application, a user may occlude one or more portions of the 2-D window by dragging and dropping a second window across a first window that is to be rendered. It is desireable in such situations, to send only those image data that represent the visible portions of the first window down stages of a graphics pipeline, while discarding those image data, or fictional image data that do not contribute to the visible portions of the first window. 3-D graphics pipelines typically do not cull such fictional image data until the very end of a rendering pipeline. Ideally, fictional image data would be culled before the end of the rendering pipeline, such that rendering pipeline resources, for example, memory and image processing cycles, would not be utilized in managing such fictional data.

In light of the above, there exists a need to overcome each of the above discussed limitations in the existing art which is satisfied by the inventive structures and methods described hereinafter. In particular, there is a need for: (1) a structure and method for spatially sorting primitives after they have been transformed into a common coordinate system, such that an image processors bandwidth is not increased and the amount of transformations required to be performed on the image data is not increased; (2) a computer structure and method providing efficient memory management of finite memory resources in a sorting stage of a 3-D graphics pipeline, such that memory overflows are prevented before they occur; (3) a structure and method for balancing rendering process resources in a 3-D graphics pipeline; and, (4) a graphics pipeline that sends only those image data that represent the visible portions of a window down stages of a graphics pipeline, while discarding those image data that are hidden that do not contribute to the visible portions of the window.

SUMMARY OF THE INVENTION

In summary, the present invention is a mid-pipeline sorting unit that sorts image data mid-pipeline in a tiled 3-D graphics pipeline architecture. The image data includes vertices of geometric primitives. The mid-pipeline sorting unit is operatively coupled to a previous processing stage of the graphics pipeline and a subsequent processing stage of the graphics pipeline. The mid pipeline sorting unit reads the image data from the previous processing stage. The mid-pipeline sorting determines whether a geometric primitive intersects a region of a 2-D window. The 2-D window having been divided into multiple such regions. Upon determining which region of the 2-D window that the geometric primitive intersects, the mid-pipeline sorting unit stores the vertices that define the geometric primitive into a memory in a manner that associates each of the geometric primitive's vertices with the region that was intersected. After the image data is sorted into the memory, the mid pipeline sorting unit sends the sorted image data to the subsequent stage on a region by region basis.

In yet another embodiment of the present invention, the mid pipeline sorting unit includes a guaranteed conservative memory estimates circuit for determining whether there is enough free memory in the memory for the mid-pipeline sorting unit to sort the image data into the memory. The guaranteed conservative memory estimate circuit returns its determination of whether there is enough free memory for the mid pipeline sorting unit to sort and store the image data.

Yet another body of the present invention, the mid pipeline sorting unit sends image data that has been sorted with respect to a set of regions of a 2-D window to the subsequent stage of the graphics pipeline in a spatially staggered sequence.

BRIEF DESCRIPTION OF THE DRAWINGS

Additional objects and features of the invention will be more readily apparent from the following detailed description and appended claims when taken in conjunction with the drawings, in which:

FIG. 9 is a flowchart illustrating aspects of store image data step 855, according to one embodiment of the present invention;

DETAILED DESCRIPTION OF THE PREFERRED EMBODIMENTS

The invention will now be described in detail by way of illustrations and examples for purposes of clarity and understanding. It will be readily apparent to those of ordinary skill in the art in light of the teachings of this invention that certain changes and modifications may be made thereto without departing from the spirit or scope of the appended claims. We first provide a top-level system architectural description. Section headings are provided for convenience and are not to be construed as limiting the disclosure, as all various aspects of the invention are described in the several sections that were specifically labeled as such in a heading.

System Overview

The present invention sorts objects/primitives in the middle of a graphics pipeline, after they have been transformed into a common coordinate system, that is, from object coordinates to eye coordinates and then to screen coordinates. This is beneficial because it eliminates the need for a software application executing on a host computer to sort primitives at the beginning of a graphics pipeline before they have been transformed. In this manner, the present invention does not increase the bandwidth requirements of graphics pipeline.

Additionally, the present invention spatially sorts image data before the end of the pipeline and sends only those image data that represent the visible portions of a window to subsequent processing stages of the graphics pipeline, while discarding those image data, or fictional image data that do not contribute to the visible portions of the window.

Yet another body that of the present invention provides a computer structure and method for efficiently managing finite memory resources in a graphics pipeline, such that a previous stage of a graphics pipeline is given an indication that certain image data will not fit into a memory without overflowing the memory's storage capacity.

Yet another embodiment of the present invention provides a structure and method for overcoming effects of scene complexity and horizon complexity in subsequent stages of a 3-D graphics pipeline, by sending image data to subsequent stages of the graphics pipeline in a manner that statistically balances the image data across the subsequent rendering resources.

Figure 1:
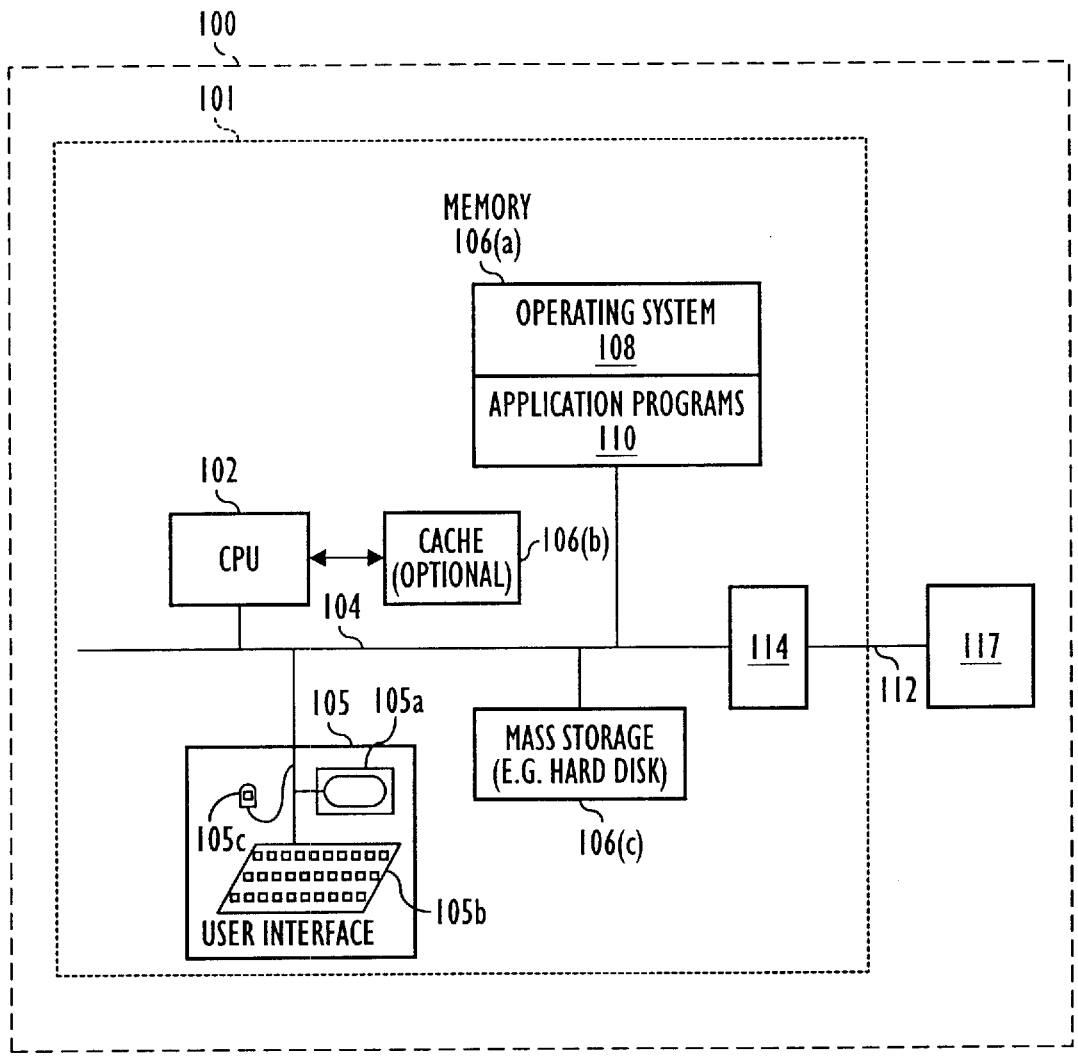
FIG. 1 is a block diagram of a system for sorting image data in a tile based graphics pipeline architecture according to an embodiment of the present invention.

Referring to FIG. 1, there is shown one embodiment of a system 100 for spatially sorting image data in a graphics pipeline, illustrating how various software and hardware elements cooperate with each other. For purposes of the present invention, spatial sorting refers to sorting image data with respect to multiple regions of a 2-D window. System 100, utilizes a programmed general-purpose computer 101, and 3-D graphics processor 117. Computer 101 is generally conventional in design, comprising: (a) one or more data processing units ("CPUs") 102; (b) memory 106a, 106b and 106c, such as fast primary memory 106a, cache memory 106b, and slower secondary memory 106c, for mass storage, or any combination of these three types of memory; (c) optional user interface 105, including display monitor 105a, keyboard 105b, and pointing device 105c; (d) graphics port 114, for example, an advanced graphics port ("AGP"), providing an interface to specialized graphics hardware; (e) 3-D graphics processor 117 coupled to graphics port 114 across I/O bus 112, for providing high-performance 3-D graphics processing; and (e) one or more communication busses 104, for interconnecting CPU 102, memory 106, specialized graphics hardware 114, 3-D graphics processor 117, and optional user interface 105.

I/O bus 112 can be any type of peripheral bus including but not limited to an advanced graphics port bus, a Peripheral Component Interconnect (PCI) bus, Industry Standard Architecture (ISA) bus, Extended Industry Standard Architecture (EISA) bus, Microchannel Architecture, SCSI Bus, and the like. In a preferred embodiment, I/O bus 112 is an advanced graphics port pro.

The present invention also contemplates that one embodiment of computer 101 may have a command buffer (not shown) on the other side of graphics port 114, for queuing graphics hardware I/O directed to graphics processor 117.

Memory 106a typically includes operating system 108 and one or more application programs 110, or processes, each of which typically occupies a separate address space in memory 106 at runtime. Operating system 108 typically provides basic system services, including, for example, support for an Application Program Interface ("API") for accessing 3-D graphics. API's such as Graphics Device Interface, DirectDraw/Direct3-D and OpenGLR. DirectDraw/Direct 3-D, and OpenGLR are all well-known APIs, and for that reason are not discussed in greater detail herein. The application programs 110 may, for example, include user level programs for viewing and manipulating images.

It will be understood that a laptop dedicated game console, or other type of portable computer, can also be used in connection with the present invention, for sorting image data in a graphics pipeline. In addition, a workstation on a local area network connected to a server can be used instead of computer 101 for sorting image data in a graphics pipeline. Accordingly, it should be apparent that the details of computer 101 are not particularly relevant to the present invention. Personal computer 101 simply serves as a convenient interface for receiving and transmitting messages to 3-D graphics processor 117.

Figure 2:
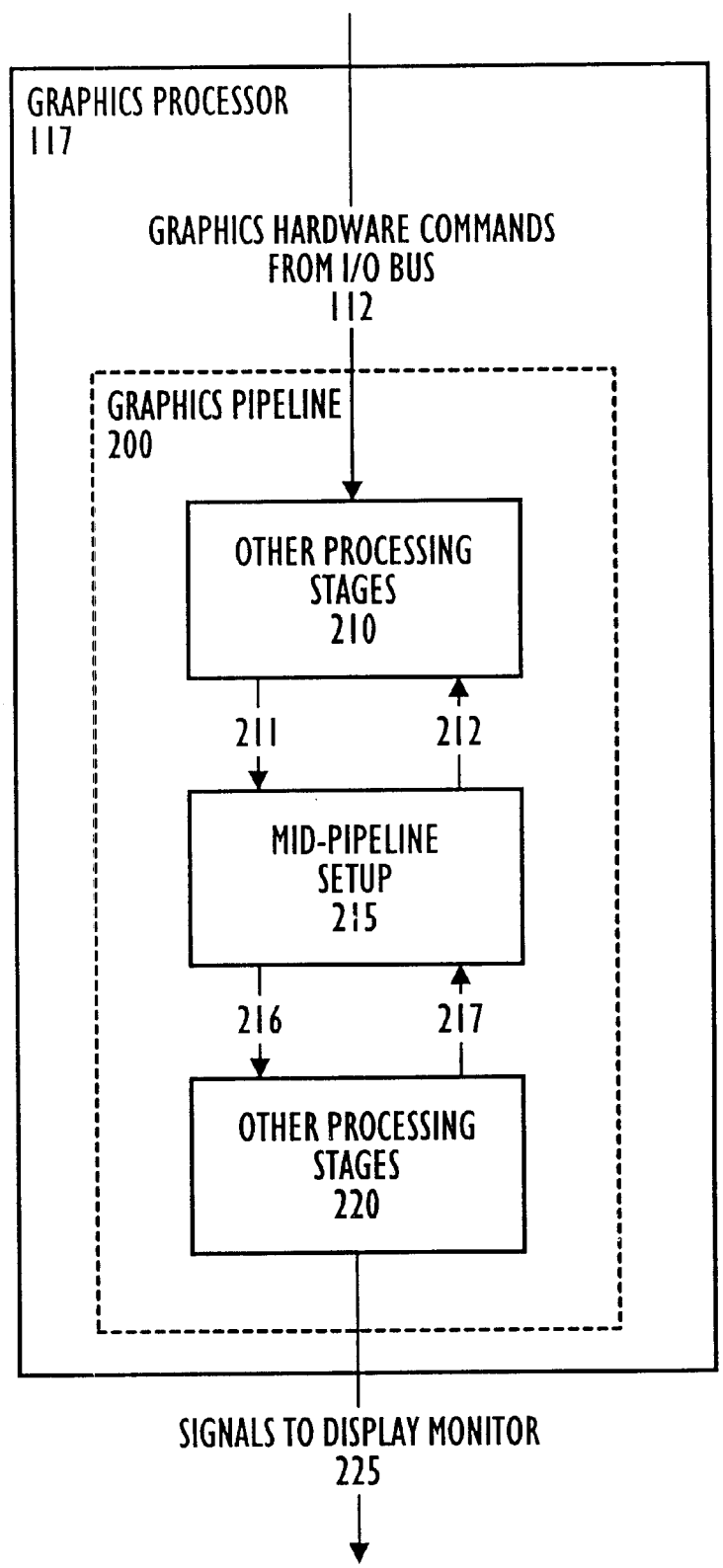
FIG. 2 is a block diagram of a 3-D Graphics Processor according to an embodiment of the present invention.

Referring to FIG. 2, there is shown an exemplary embodiment of 3-D graphics processor 117, which may be provided as a separate PC Board within computer 101, as a processor integrated onto the motherboard of computer 101, or as a stand-alone processor, coupled to graphics port 114 across I/O bus 112, or other communication link.

Spatial sorting stage 215, hereinafter, often referred to as "sort 215," is implemented as one processing stage of multiple processing stages in graphics processor 117. Sort 215 is connected to other processing stages 210 across internal bus 211 and signal line 212. Sort 215 is connected to other processing stages 220 across internal bus 216 and signal line 217.

The image data and signals sent respectively across internal bus 211 and signal line 212 between sort 215 and a previous stage of graphics pipeline 200 are described in great detail below in reference to the interface between spatial sorting 215 and mode extraction 415. The image data and signals sent respectively across internal bus 216 and signal line 217 between sort 215 and a subsequent stage of graphics pipeline 200 are described in great detail below in reference to interface between spatial sorting 215 and setup 505.

Internal bus 211 and internal bus 216 can be any type of peripheral bus including but not limited to a Peripheral Component Interconnect (PCI) bus, Industry Standard Architecture (ISA) bus, Extended Industry Standard Architecture (EISA) bus, Microchannel Architecture, SCSI Bus, and the like.

Other Processing Stages 210

In one embodiment of the present invention, other processing stages 210 (see FIG. 2) can include, for example, any other graphics processing stages as long as a stage previous to sort 215 provides sort 215 with spatial data.

Figure 4:
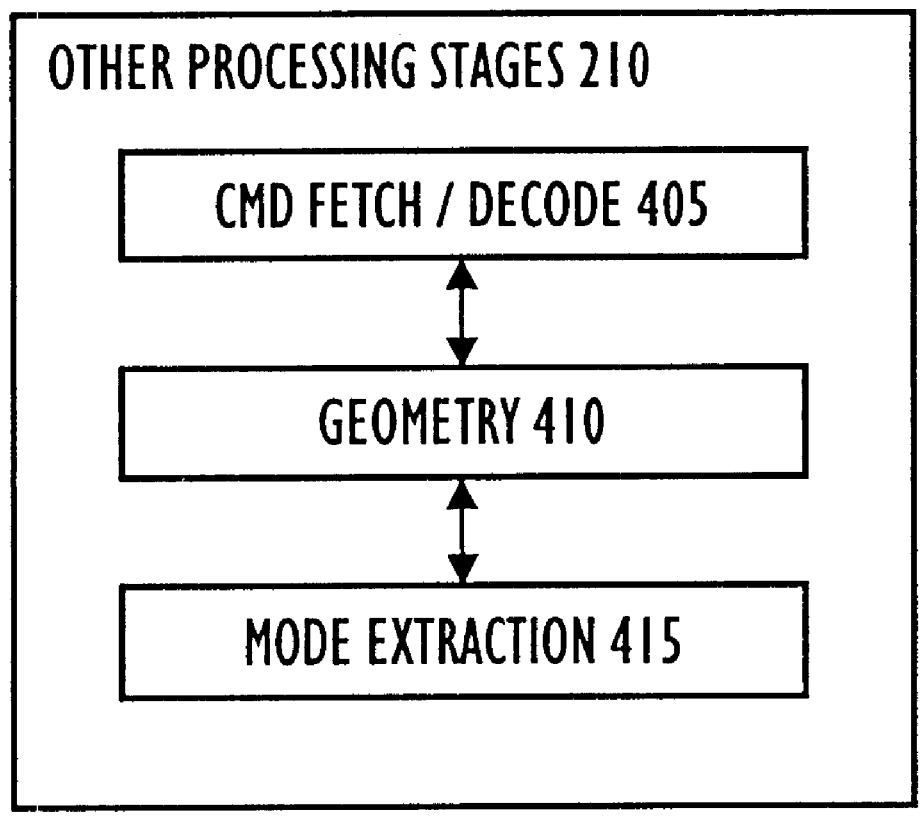
FIG. 4 is a block diagram illustrating an example of other processing stages 210 according to one embodiment of the graphics pipeline of the present invention.

Referring to FIG. 4, there is shown an example of a preferred embodiment of other processing stages 210, including, command fetch and decode 405, geometry 410, and mode extraction 415. We will now briefly discuss each of these other processing stages 210.

Cmd Fetch/Decode 405, or "CFD 405" handles communications with host computer 101 through graphics port 114. CFD 405 sends 2-D screen based data, such as bitmap blit window operations, directly to backend 440 (see FIG. 4, backend 440), because 2-D data of this type does not typically need to be processed further with respect to the other processing stage in other processing stages 210 or other processing stages 240. All 3-D operation data (e.g., necessary transform matrices, material and light parameters and other mode settings) are sent by CFD 405 to the geometry 410.

Geometry 410 performs calculations that pertain to displaying frame geometric primitives, hereinafter, often referred to as "primitives," such as points, line segments, and triangles, in a 3-D model. These calculations include transformations, vertex lighting, clipping, and primitive assembly. Geometry 410 sends "properly oriented" geometry primitives to mode extraction 415.

Mode extraction 415 ("MEX") separates the input data stream from geometry 410 into two parts: (1) spatial data, such as frame geometry coordinates, and any other information needed for hidden surface removal; and, (2) non-spatial data, such as color, texture, and lighting information. Spatial data are sent to sort 215. The non-spatial data are stored into polygon memory (not shown). (Mode injection 515 (see FIG. 5) later retrieves the non-spatial data and re-associates it with graphics pipeline 200).

The details of processing stages 210 is not necessary to practice the present invention, and for that reason other processing stages 210 are not discussed in further detail here.

Spatial Sorting 215

Sort 215's I/O subsystem architecture is designed around the need to spatially sort image data according to which of multiple, equally sized regions that define the limits of a 2-D window are touched by polygons identified by the image data. Sort 215 is additionally designed around a need to efficiently send the spatially sorted image data in a tile-by-tile manner across I/O bus 216 to a next stage in graphics pipeline 200, or pipeline 200.

Top Level Architecture

Figure 3:
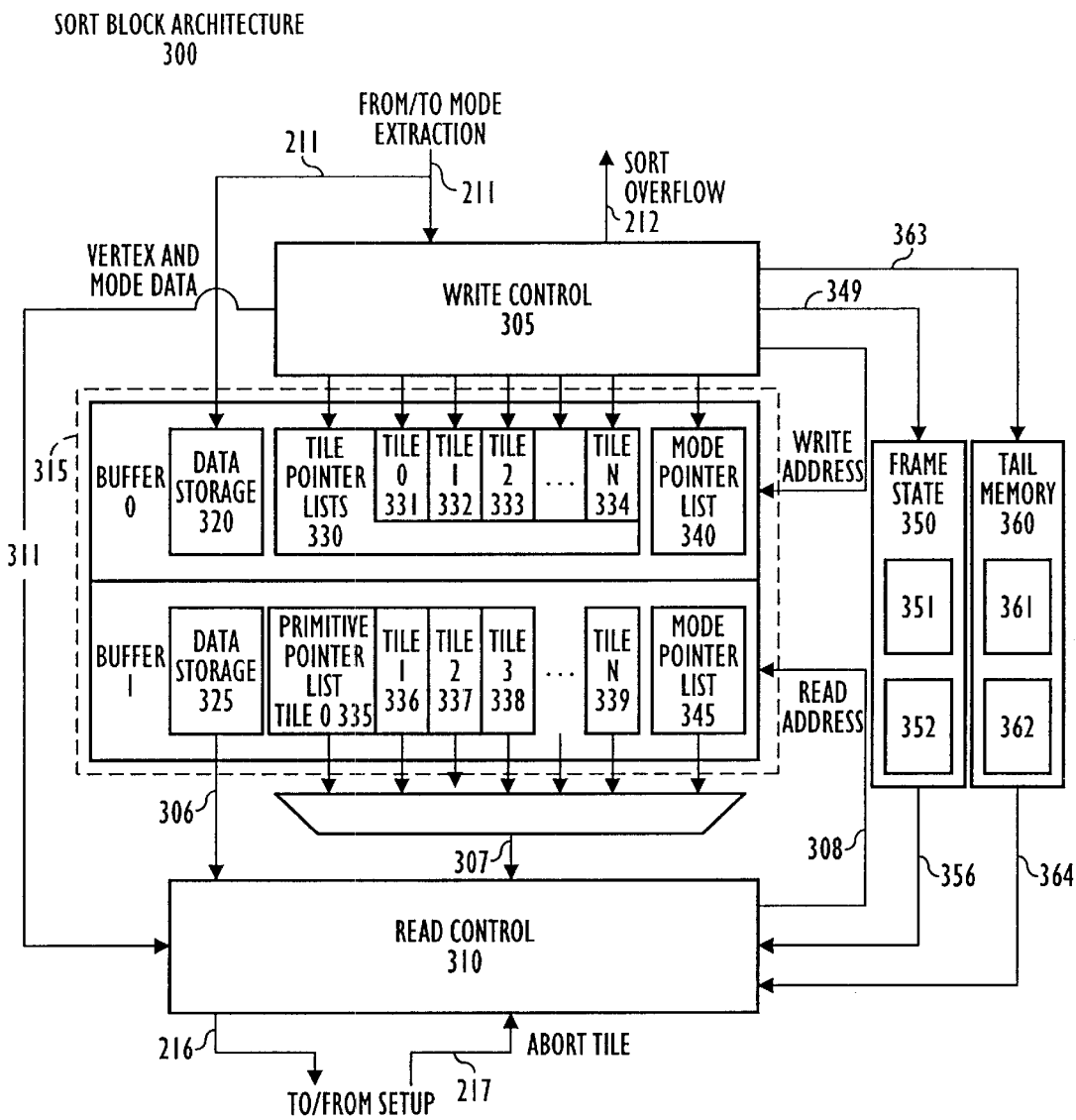
FIG. 3 is a block diagram illustrating an embodiment of the Sort Block Architecture.

Referring to FIG. 3, there is shown an example of a preferred embodiment of sort 215, for illustrating an exemplary structure as well as data storage and data flow relationships. To accomplish the above discussed goals, sort 215 utilizes two basic control units, write control 305 and read control 310, that are designed to operate in parallel. The basic idea is that write control 305 spatially sorts image data received from a previous page of the graphics pipeline into sort memory 315, and subsequently notifies read control 310 to send the sorted spatial data from sort memory 315 to a next stage in the graphics pipeline. For a greater detailed description of write control 305 and read control 310, refer respectively to FIGS. 8, 9 and 18.

The present invention overcomes the shortcomings of the state of the art by providing structure and method to send only those image data that represent the visible portions of a window down stages of a graphics pipeline, while discarding those image data, or fictional image data that do not contribute to the visible portions of the window. This embodiment is described in greater detail below in reference to read control 310 and scissor windows.

In yet another preferred embodiment of the present invention, write control 305 performs a guaranteed conservative memory estimate to determine whether there is enough sort memory 315 left to sort image data from a previous process in graphics pipeline 200 into sort memory 315, or whether a potential sort memory 315 buffer overflow condition exists. The guaranteed conservative memory estimate is discussed in greater detail below in reference to FIGS. 11 and 12.

Figure 18:
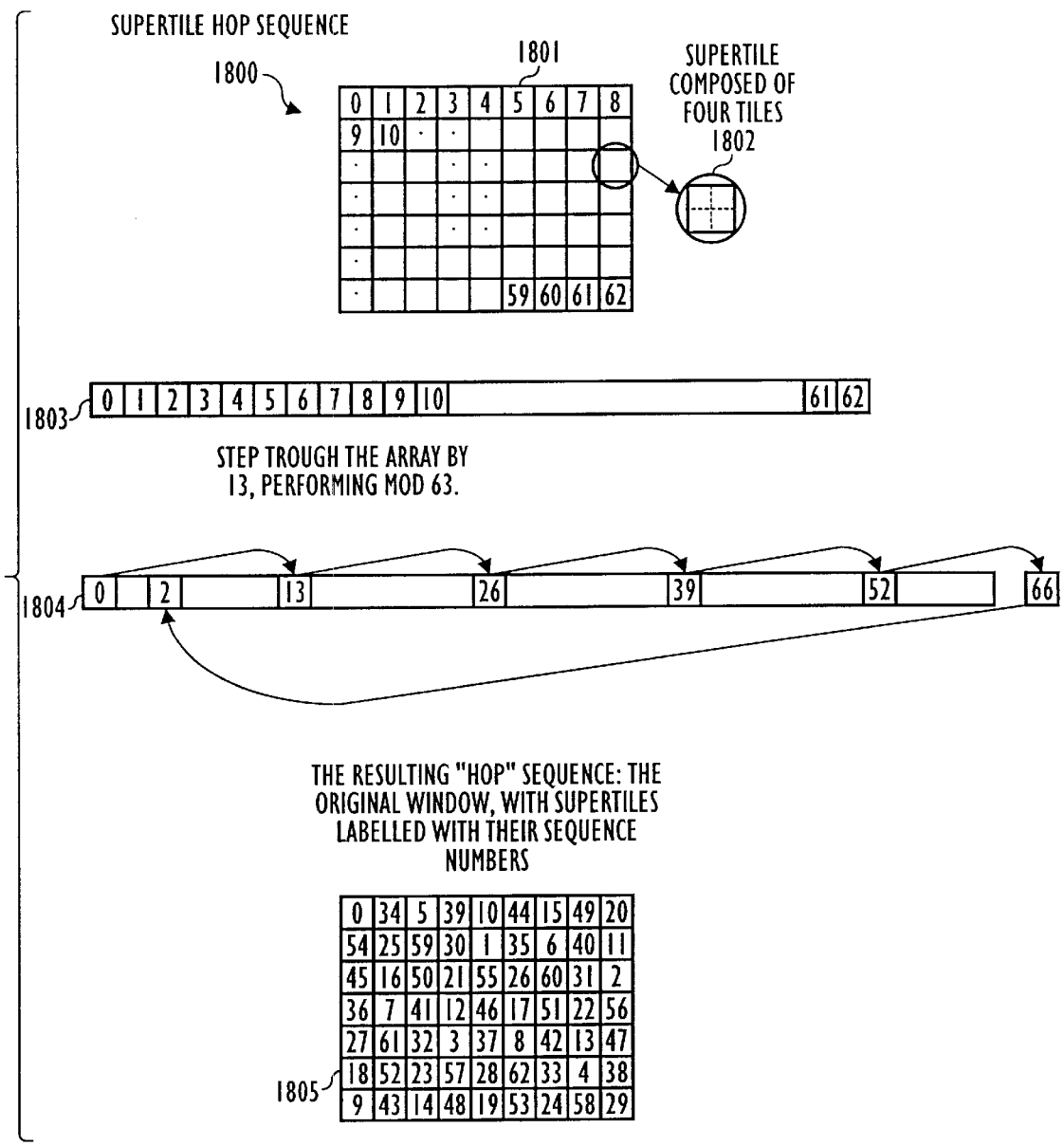

In yet another preferred embodiment of the present invention, read control 310 sends the spatially sorted image data to a next to process (see FIG. 5) in graphics pipeline 200 in a balanced manner, such that the rendering resources of subsequent status of graphics pipeline 200 are efficiently utilized, meaning that one stage of pipeline 200 is not overloaded with data while another stage of pipeline 200 is starved for data. Instead, this preferred embodiment, the odds are increased that data flow across multiple subsequent stages will be balanced. This process is discussed in greater detail below in reference to the tile hop sequence, an example of which is illustrated in FIG. 18.

Interface Between Spatial Sorting 215 and Mode Extraction 415

We will now describe various packets sent to sort 215 from a previous stage of pipeline 200, for example, mode extraction 415. For each packet type, a table of all the parameters in the packet is shown. For each parameter, the number of bits is shown.

Referring to table 1, there is shown an example of spatial packet 1000. The majority of the input to sort 215 from a previous stage of pipeline 200 are spatial packets that include, for example, a sequence of vertices that are grouped into sort primitives. Vertices describe points in 3-D space, and contain additional information for assembling primitives. Each spatial packet 1000 causes one sort memory vertex packet to be written into data storage by write control 305 to an input buffer in sort memory 315 buffer, for example, buffer 0.

Spatial packet 1000 includes, for example, the following elements: transparent 1020, line flags 1030, window X 1040, window Y 1050, window Z 1060, primitive type 1070, vertex reuse 1080, and LinePointWidth 1010. Each of these elements are discussed in greater detail below as they are utilized in by either write control 305 or read control 310.

LinePointWidth element 1010 identifies the width of the geometry primitive if the primitive is a line or a point.

Primitive type 1070 is used to determine if the vertex completes a triangle, a line, a point, or does not complete the primitive. Table 7 lists the allowed values 7005 for each respective primitive type 1070, each value's 7005 corresponding implied primitive type 7010, and the number of vertices 7015 associated with each respective implied primitive type. Values 7005 of three ("3") are used to indicate a vertex that does not complete a primitive. An example of this is the first two vertices in a triangle; only the third vertex completes the triangle primitive. Values 7005 other than three indicate that the vertex is a completing vertex. Primitive type 1070 "0" is used for points. Primitive type 1070 "1" is used for lines. And, Primitive type 1070 "2" is used for triangles, even if they are to be rendered as lines, or line mode triangles.

Referring to Table 2, there is shown an example of a began frame packet 2000. The beginning of a user frame of image data is designated by reception of such a begin frame packet 2000 by sort 215. A user frame is all of the data necessary to draw one complete image, whereas an animation consist of many sequential images. Begin frame packets 2000 are passed down pipeline 200 to sort 215 by a previous processing stage of pipeline 200, for example, mode extraction 415 (see FIG. 4).

PixelsVert 2001 and PixelsHoriz 2002 are used by write control 305 to determine the size of the 2-D window, or user frame. In a preferred embodiment of the present invention, SuperTileSize 2003, and SuperTileStep 2004 elements are used by read control 310 to output the spatially sorted image data in an inventive manner, called a "SuperTile Hop Sequence" to a subsequent stage of graphics pipeline 200, for example setup 405. The SuperTile Hop Sequence is discussed in greater detail below in reference to FIG. 18, and read control 310.

Sort transparent mode element 2005 is used by read control 310, as discussed in greater detail below in reference to read control 310 and output modes used to determine an order that spatially sorted image data are output to a subsequent stage of pipeline 200, for example, setup 505

Sort 215 does not store begin frame packet 2000 into sort memory 315, but rather sort 215 saves the frame data into frame state buffer 350 (see FIG. 3). Such frame data includes, for example, screen size (X, Y) Tile hop value (M) buffers enabled (front, back, left, and right), and transparency mode.

Referring to Table 3, there is shown an example of end frame packet 3000, for designating either: (a) an end of a user frame of image data; (b) a forced end of user frame instantiated by an application program executing in, for example, memory 106a of computer 101; or, (c) for designating an end of a frame of image data caused by a need to split a frame of image data into multiple frames because of a memory overflow.

When a forced end of user frame is sent by an application program, end frame packet 3000 will have the SoftEndFrame 3010 element set to "1." A forced end of user frame indication is simply a request instantiated by an application executing on, for example, computer 101 (see FIG. 1), for the current image frame to end.

BufferOverflow Occurred 3015 is used by write control 305 to indicate that this end of frame packet 3000 is being received as a result of a memory buffer overflow event. For more information regarding sort memory 315 overflow, refer to write control 305, FIG. 8, step 845.

Referring to table 4, there is shown an example of a clear packet 4000 and a cull mode packet 4500. Hereinafter, a clear packet 4000 and/or a cull mode packet 4500 are often referred to in combination or separately as "mode packets." Mode packets typically contain information that effects multiple vertices. Receipt of mode packets, 4000 or 4500, by sort 215 results in each respective mode packet being written into sort memory 315.

A graphics application, during the course or rendering a frame, can clear one or more buffers, including, for example, a color buffer, a depth buffer, and/or a stencil buffer. Color buffers, depth buffers, and stencil buffers are known, and for this reason are not discussed in greater detail herein. An application typically only performs a buffer clear at the very beginning of a frame rendering process. That is, before any primitives are rendered. Such buffer clears are indicated by receipt by sort 215 of clear packets 4000 (see Table 4). Clear packets 4000 are not used by sort 215, but are accumulated into sort memory 315 in-time order, as they are received, and output during read control 310.

Sort 215 also receives cull packet 4500 from a previous stage in pipeline 2000, such as, for example, mode extraction 415 (see FIG. 4). A scissor window is a rectangular portion of the 2-D window. SortScissorEnable 4504, if set to "1" indicates that a scissor window is enabled with respect to the 2-D window. The scissor window coordinates are givent by the following elements in cull packet 4500: SortScissorXmin 4505, SortScissorXmax 4506, SortScissorYmin 4507 and SortScissorYmax 4508. In one embodiment of the present invention, scissor windows are used both by write control 305 (see FIG. 8, step 855) and read control 310 (see FIG. 17, step 1715).

Interface Signals

Referring to table 15, there are shown interface signals sent between sort 215 and mode extraction 415. The interface from sort 215 to mode extraction 415 is a simple handshake mechanism across internal data bus 211. Mode extraction 415 waits until sort 215 sends a ready to send signal, srtOD_ok2Send 1520, indicating that sort 215 is ready to receive another input packet. After receiving the sort okay to send signal from sort 215, mode extraction 415 places a new packet onto internal input bus 211 and indicates via a data ready signal, mexOB_dataReady 1505, that the data on is a valid packet.

Figure 8:
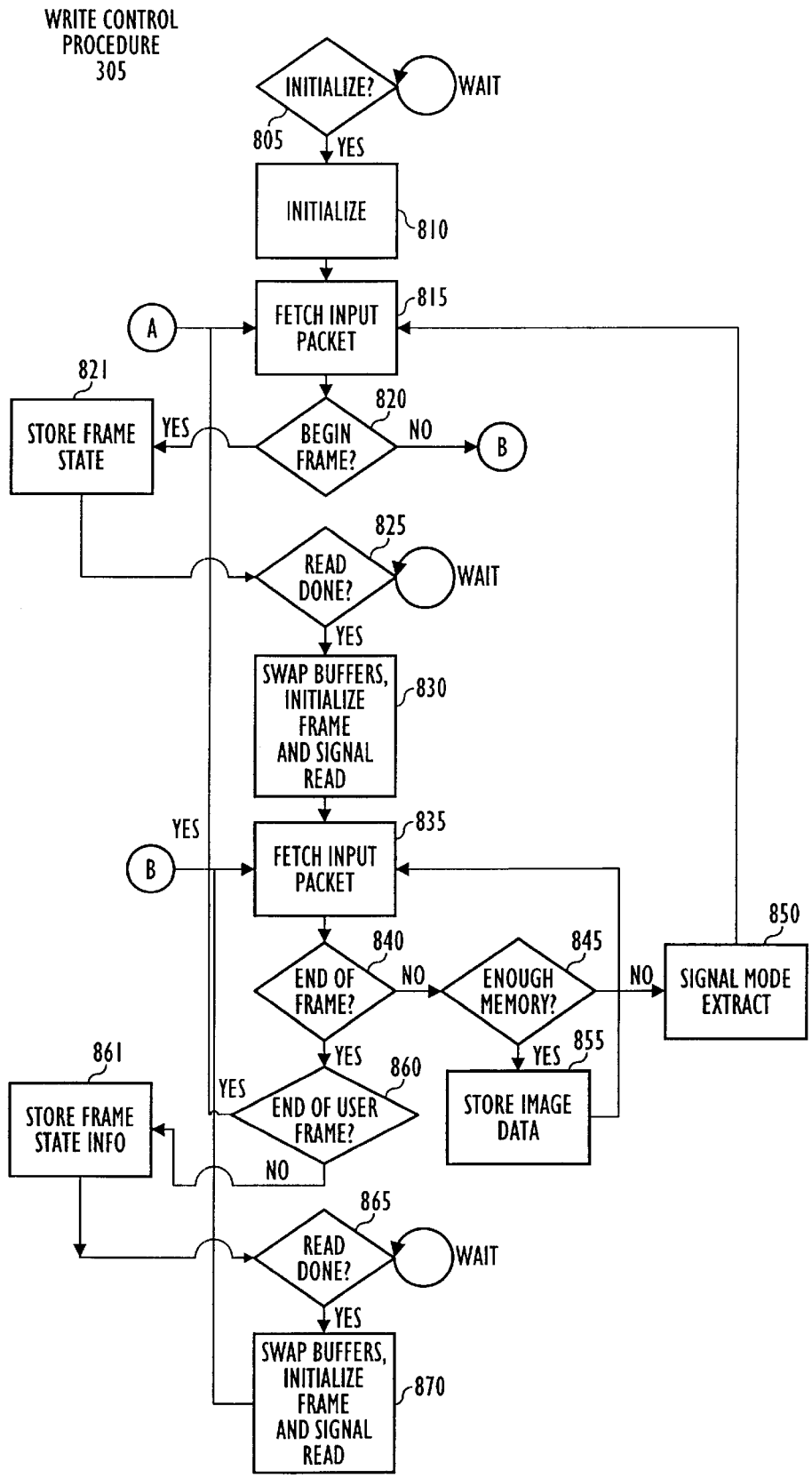
FIG. 8 is a flowchart illustrating aspects of write control 305 procedure according to one embodiment of the present invention.

In response to receiving the data ready signal, if the last packet sent by mode extraction 415 will not fit into sort memory 315, sort 215 sends mode extraction 415 a sort buffer overflow signal, srtOD_srtOverflow 1525, over signal line 212 (see FIG. 2) to indicate that the last input packet to sort 215 from mode extraction 415 could cause sort memory overflow. Receipt of a sort buffer overflow signal indicates to mode extraction 415 that it needs to swap sort memory 315 buffers. Swapping simply means only that "writes" are to be directed only at the memory previously designated for "reads," and vice versa. The process of swapping sort memory 315 buffers is discussed in greater detail below with reference to write control 305, as illustrated in FIG. 8, step 845.

If the last data packet sent by mode extraction 415 will fit into sort memory 315, sort 215 sends two signals to mode extraction 415. The first signal, a will fit into memory signal, or srtOD_lastVertexOK 1515, indicates that the last packet sent by mode extraction 415 will fit into sort memory 315. The second signal, the sort okay to send signal, indicates that sort 215 is ready to receive another packet from mode extraction 415.

It can be appreciated that the specific values selected to represent each of the above signals are not necessary to practice the present invention. It is only important that each signal has such a unique value with respect to another signal that each signal can be differentiated from each other signal by sort 215 and mode extraction 415.

Sort Memory Structure and Organization

Sort Memory 315 is comprised of a field upgradable block of memory, such as PC RAM. In one embodiment of the present invention, sort memory is single buffered, and write control 305 spatially sorts image data into the single buffer until either sort memory 315 overflows, sort 215 receives an indication from an application executing on, for example, computer 101 (see FIG. 1) to stop writing data into memory, or write control 305 receives an end of frame packet 3000 from a previous processing stage in pipeline 200 (see Table 3). Memory overflow occurs when either sort memory 315 or another memory (not shown), such as, for example, polygon memory (not shown) fills up.

In such a situation, write control 305 will signal read control 310 across signal line 311 indicating that read control 310 can begin to read the spatially sorted image data from sort memory 315, and send the spatially sorted image data across I/O bus 216 to a next stage in graphics pipeline 200.

In a preferred embodiment of the present invention, sort memory 315 is double buffered, including a first buffer, buffer 0, and a second buffer, buffer 1, to provide simultaneous write access to write control 305, and read access to read control 310. In this preferred embodiment, write control 305 and read control 310 communicate across signal line 311, and utilize information stored in various queues in sort memory 315, frame state 350 and tail memory 360, to allow their respective execution units to operate asynchronously, in parallel, and independently.

Either of the two buffers, 0 or 1, may at times operate as the input or output buffer. Each buffer 0 and 1 occupies a separate address space in sort memory 315. The particular buffer (one of either of the two buffers) that, at any one time, is being written into by write control 305, is considered to be the input buffer. The particular buffer (the other one of two buffers) where data is being read out of it by read control 310, is considered to be the output buffer.

To illustrate this preferred embodiment, consider the following example, where write control 305 spatially sorts image data into one of the two buffers in sort memory 315, for example, buffer 0. When buffer 0 fills, or in response to write control 305 receiving of end frame packet 3000 (see Table 3) from a previous stage of graphics pipeline 200, write control 305 will swap sort memory 315 buffer 0 with sort memory 315 buffer 1, such that read control 310 can begin reading spatially sorted image data out of sort memory 315 buffer 0 to a next stage of graphics pipeline 200, while, in parallel, write control 305 continues to spatially sort unsorted image data received from a previous processing stage in graphics pipeline 200, into empty sort memory 315 buffer 1.

Sort 215 receives image data corresponding to triangles after they have been transformed, culled and clipped from a previous date in pipeline 200. For greater detailed description of the transformed, culled and clipped image data that sort 215 receives, refer above to "other processing stages 210."

To spatially sort image data, sort 215 organizes the image data into a predetermined memory architecture. Image data, includes, for example, polygon coordinates (vertices), mode information (see Table 4, clear packet 4000 and cull packet 4500), etc . . . In a preferred embodiment of the present invention, the memory architecture includes, for example, the following data structures mirrored across each memory buffer, for example, buffer 0 and buffer 1: (a) a data storage, for example, data storage 320; (b) a set of tile pointer lists, for example, title pointers lists 330; and, (c) a mode pointer list, for example, mode pointer list 340.

For each frame of image data that sort 215 receives from a previous stage of pipeline 200, sort 215 stores three types of packets in the order that the packets are received (hereinafter, this order is referred to as "in-time order") into data storage 320, including: (1) sort memory vertex packets 8000 (see Table 8), which contain only per-vertex information; (2) sort memory clear packets 4000 (see Table 4), which causes buffer clears; and (3) sort memory cull packets 4500 (see Table 4), which contain scissor window draw buffer selections).

These three packet types fall into two categories: (1) vertex packets, including vertex packet type 8000 packets, for describing points in 3-D space; and, (2) mode packets, including sort memory clear buffer 4000 packets and sort memory cull packets 4500. We will now discuss how these three packet types and other related information are stored by sort 215 into sort memory 315.

Referring to Table 5, there are shown examples of sort 215 pointers, including vertex pointer 5005, clear mode packet pointer 5015, cull mode packet pointer 5020, and link address packet 5025.

Vertex pointers 5005 point to vertex packets 8000, and are stored by sort 215 into respective tile pointer lists (see, for example, FIG. 3, tile pointer list 330), in-time order, as vertex packets 8000 are received and stored into data storage (see, for example, FIG. 3, data storage 320). Packet address pointer 5006 points to the address in data storage of the last vertex packet 8000 of a primitive that covers part of a corresponding tile.

As discussed above, the last vertex completes the primitive (hereinafter, such a vertex is referred to as a "completing vertex"). Packet address pointer 5006 in combination with offset 5007 are used by write control 305 and read control 310 in certain situations to determine any other coordinates (vertices) for the primitive (such situations are described in greater detail below in reference to write control 305 and read control 310). We will now describe a procedure to determine the coordinates of a primitive from its corresponding vertex pointer 5005.

Offset 5007 is used to identify each of the particular primitives other vertices, if any. If offset 5007 is "0," the primitive is a point. If offset 5007 is "1", the primitive is a line, and the other vertex of the line is always the vertex at the immediately preceding address of packet address pointer 5006. If offset 5007 is 2 or more, then the primitive is a triangle, the corresponding vertex packet 8000 (pointed to by packet address pointer 5006) contains the coordinates for the triangle's completing vertex, the second vertex is always the immediately prior address to packet address pointer 5006, and the first vertex is determined by subtracting the offset from the address of packet address pointer 5006.

Transparent flag 5008 corresponds to the value of transparent element 1020 contained in spatial packet 1000.

Clear mode packet pointer 5015 points to clear mode packet's stored by a sort 215 in time order, as they are received, into data storage 320. Clear mode packet pointers 5015 are stored by sort 215 in-time order, as they are received, into mode pointer list 340.

For each mode packet received by sort 215, a mode pointer (see Table 5000, depending on the type of mode packet, either a clear mode packet pointer 5015 or a cull mode packet pointer 5020) is added to a mode pointer list (see FIG. 3). These pointers, either 5015 or 5020, also contain an address, either 5016 or 5021, where the mode packet is stored, plus bits, either 5017 or 5022, to tell read control 310 the particular mode packets type (clear 4000 or cull 4500), and an indication, either 5018 or 5023, of whether the mode packet could cause a sub-frame break in sorted transparency mode (described greater detail below with respect to read control 310).

Write control 305 stores pointers to the polygon information stored in data storage 320 into a set of tile pointer lists 330 according to the tiles, that are intersected by a respective polygon, for example, a triangle, line segment, or point. (A triangle is formed by the vertex that is the target of the pointer along with the two previous vertices in data storage 320.) This is accomplished by building a linked list of pointers per tile, wherein each pointer in a respective tile pointer list 330, corresponds to the last vertex packet for a primitive that covers part of the corresponding tile.

To illustrate storage of image data into memory, refer to FIG. 3, and in particular into a tile pointer list 330, consider the following example. If a triangle touches four tiles, for example, tile 0 331, tile 1 332 tile 2 333, and tile N 334, a vertex pointer 5005 to the third vertex, or the last vertex of the triangle is added to each tile pointer list 330 corresponding to each of those four touched tiles. In other words, a vertex pointer 5005 referencing the last vertex of the triangle is added to each of the following tile pointer lists 330: (a) tile 0 tile pointer list 331; tile 1 tile pointer list 332; tile 2 tile pointer list 333; and, (d) tile three tile pointless to 333; and, (e) tile N tile pointer list 334.

Line segments are similarly sorted into a tile pointer list, for example tile pointer list 320, according to the tiles that the line segment intersects. It can be appreciated that lines, line mode trianges, and points have an associated width. To illustrate this, consider that a point, if situated at the intersection of 4 tiles, could touch all four tiles.

Figure 15:
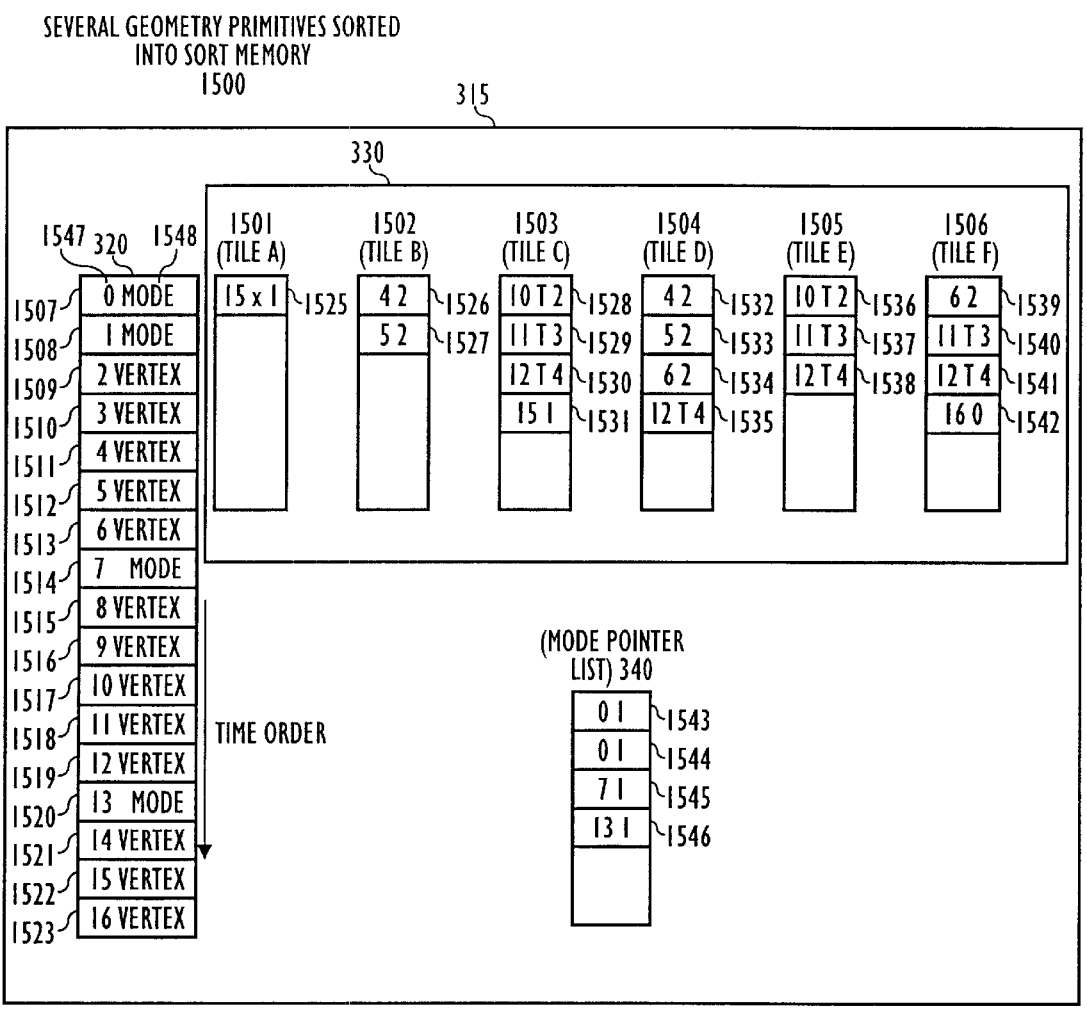
FIG. 15 is a block diagram illustrate aspects of multiple geometry primitives having been sorted into sort memory by the procedures of the sort block according to one embodiment of the present invention.
Figure 16:
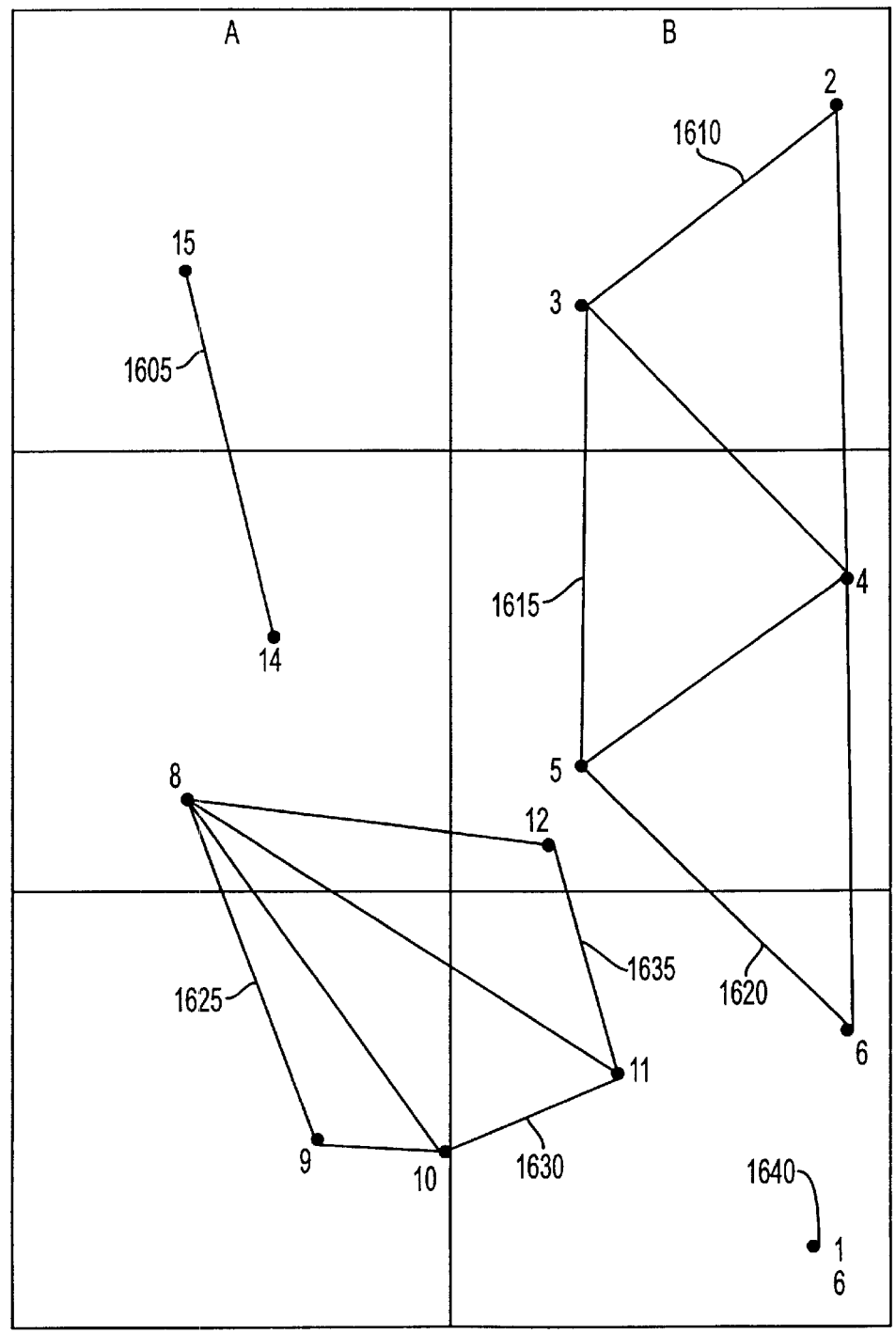
FIG. 16 is a block diagram illustrating aspects of a 2-D window divided by multiple tiles and including multiple geometry primitives according to one embodiment of the teachings of the present invention.

As a further illustration, refer to FIG. 15, where there is shown spatial data and mode data organized into a sort memory 315 buffer, for example buffer 0 (see, FIG. 3), with respect to eight geometry primitives 1605, 1610, 1615, 1620, 1625, 1630, 1635, and 1640, each of which is shown in FIG. 16. In this example, one tile pointer list 1501, 1502, 1503, 1504, 1505 or 1506, is constructed for each respective tile A, B, C, D, E, and F, in a 2-D window as illustrated in FIG. 16.

For the purposes of this example, each data storage 320 entry 1507–1523 includes an address, for example, address 1547 and a type of data indication, for example, type of data indication 1548. The first image data packet, a mode packet (either a clear packet 4000 or a cull packet 4500) received by write control 305 is stored at address 0 1547.

Each vertex pointer 1525–1542 references vertex packets 1509–1513, 1515–1519, and 1521–1523 (see Table 8, vertex packet 8000) that contain a completing vertex to a corresponding primitive that covers part of the tile represented by a respective tile pointer list 1501–1506.

In a preferred embodiment of the present invention only vertex pointers X to vertex packets 8000 that contain a completing vertex are stored by write control 305 into a tile pointer lists.

With further reference to FIG. 16, line segment 1605, including vertices 14 and 15, touches tiles A and C, and is completed by vertex 15. As a matter of convention, for complex polygons, those having more than one vertex, the last vertex in the pipeline is considered to be the completing vertex. However, the present invention also contemplates that another ordering is possible, for example, where the first vertex in the pipeline is the completing vertex.

Write control 305 writes first pointer 1525 and first pointer 1531 (see FIG. 15), each referencing the packet 1522 (containing completing vertex 15), into corresponding tile pointer lists 1501 and 1503, that represent tiles A and C respectively.

Triangle 1610, identified by vertices 2, 3, and 4, touches tiles B and D, and is completed by vertex 4 write control 305 writes first pointers 1526 and 1532 (see FIG. 15), referencing packet 1511 (containing completing vertex 4), into the corresponding tile pointer lists 1502 and 1504, that represent tiles B and D respectively.

Triangle 1615, identified by vertices 3, 4, and 5, touches tiles B and D, and is completed by vertex 5.write control 305 writes first pointers 1527 and 1533, referencing packet 1512 (containing completing vertex 5), into the corresponding Tile Pointer Lists 1502 and 1504, that represent tiles B and D respectively.

Triangle 1620, identified by vertices 4, 5, and 6, touches tiles D and F, and is completed by vertex 6.write control 305 writes first pointers 1534 and 1539, referencing packet 1513 (containing completing vertex 6), into the corresponding Tile Pointer Lists 1504 and 1506, that represent tiles D and F respectively.

Triangle 1625, identified by vertices 8, 9 and 10, touches tiles C and E, and is completed by vertex 10.write control 305 writes first pointers 1528 and 1536, referencing packet 1517 (containing completing vertex 10), into the corresponding Tile Pointer Lists 1503 and 1505, that represent tiles C and E respectively.

Each of the remaining geometry primitives in 2-D window 600, including triangles 1630 and 1635, as well as point 1640, are sorted according to the same algorithm discussed in detail above with respect to the sorted line segment 1605, and triangles 1610, 1615, 1620 and 1625.

In one embodiment of the present invention, as Mode Packets 4000 and/or 4500, for example, packets 1507, 1508, 1514 and 1520, are received by write control 305 they are stored in-time order into an input buffer in data storage. For each mode packet 4000 and/or 4500 that is received, a corresponding mode pointer (depending on the type of mode packet, clear mode packet pointer 5015 or cull mode packet pointer 5020), for example pointers 1543, 1544, 1545 and 1546, is written into a mode pointer list 170.

In yet another embodiment of the present invention, if a geometry primitive is a line mode triangle, it is sorted according to the tiles its edges touch, and a line mode triangle having multiple edges in the same tile only causes one entry per tile.

Frame State

As frames of image data are written into sort memory 315 by write control 305, and subsequently read out of sort memory 315 by read control 310, to keep track of the various frame state information, frame state information is kept stored at numerous different levels in frame state register 350. Such information includes, for example, a number of regions that horizontally and the vertically divide the 2-D display window, and whether the data in the frame buffer is in "time order mode" or "sorted transparency mode" (both of these modes are discussed in detail below in reference to read control 310, and FIG. 17).

In one embodiment of the present invention frame state register buffer 350 comprises a single set of registers 351. However, in a preferred embodiment of the present invention frame state register 350 comprises two sets of registers, including, one set of input registers, either 351 or 352, and one set of output registers, either 351 or 352. Either of the two sets of state registers, 351 or 352, may at times operate as the input or output register. The particular register (one of either of the two registers) that, at any one time, is being written into by write control 305, is considered to be the input register. The particular register (the other one of two registers) where data is being read out of it by read control 310, is considered to be the output register.

When sort memory 315 buffer 0 is swapped with buffer 1, frame state register buffer 351 is also copied into with frame state 352 register.

We will now discuss the particular information stored by write control into the various registers that are used to store frame state information in frame state registers 350.

Input buffer frame state register, either one of 351 or 352, depending on which is the input register at the time, is loaded with the frame state from the begin frame packet 2000. Signals are used by write control 305 to determine and set the operating mode of the write pipeline. Such operating modes include, for example, in-time order operating mode and sorted transparency operating mode, both of which are described in greater detail below in reference to write control 310.

Input buffer frame state 350 register EndFrame register (not shown) is loaded from end of frame packet 3000. Data that is included in EndFrame register includes, for example, soft overflow indication.

Input buffer frame state 350 register FrameHasClears register (not shown) is set by write control 305 for use by read control 310. Write control 305 sets this register in response to receiving a clear packet 4000 for the application. As will be described below in greater detail in reference to read control 310, and FIG. 17, read control 310 will immediately discard tiles that do not have any geometry in frames having no clears (e.g. clear packets 4000 associated with the geometry).

MaxMem register (not shown) is loaded by write control 305 during initialization of sort 215, and is used for pointer initialization at the beginning of the frame. For example, it is typically initialized to the size of sort memory buffer 315.

Tail Memory 360

In a preferred embodiment of the present invention, certain data structures in sort memory 315 are implemented as linked list data structures, for example, tile pointer lists (for example, referring to FIG. 3, tile 0 tile pointer list 331, tile 1 tile pointer list 332, tile 2 tile pointer list 333, and tile N tile pointer list 334) and mode pointer lists (for example, mode pointer list 340). Linked list data structures, and the operation of linked list data structures (adding and deleting elements from a linked list data structure) are known, for this reason the details of linked list data structures are not described further herein.

Typically, adding elements to a linked list data structure, results in a read/modify write operation. For example, if adding an element to the end of a linked list, the last element's next pointer in the linked list must be read, and then modified to equal the address of a newly added element. Performing a single read/modify write takes processor 117 (see FIG. 2) bandwidth. Performing enough read/modify writes in a row can take away a significant amount of processor 117 bandwidth. While sorting primitives into sorts memory 315, write control 305 is adding elements to link lists, for example, tile pointer lists, and mode pointer lists (see FIG. 3). It is desirable to minimize the number of read/modify write operations so that processor bandwidth can be used for other graphic pipeline 200 operations, such as, for example, setup 505 and cull 510 (see FIG. 5). What is needed is a structure and method for reducing the number of read/modify rights and thereby increase processor bandwidth.

A preferred embodiment of the present invention reduces the number of read/modify writes that write control 305 must perform to add elements to a linked list data structure.

Referring to FIG. 3, there is shown tail memory 360, used by write control 305 and read control 310 to reduces the number of read/modify writes. Referring to Table 6, there is shown in example of an entry 6000 in tail memory 360, including: (a) addr head 6005, for pointing to be beginning of a link list data structure; (b) addr tail 6010, for pointing to the end of the linked list data structure; and, (c) no. entries 1015, for indicating the number of entries in the linked list data structure.

In a preferred embodiment of the present invention, each linked list data structure in sort memory 315 has an associated entry 6000 in tail memory 360. This preferred embodiment will allocate two memory locations each time that it allocates memory to add an element to a linked list data structure. At this time, the "next element" pointer (not shown) in the current last element in the link list data structure is updated to equal the address of the first allocated element's memory location. Next, the first allocated element's "next element" pointer (not shown) is updated to equal the second allocated element's memory location. In this manner, the number of read/modify writes that write control 305 must perform to add an element to a link data list is reduced to "writes".

When write control 305 has completed spatially sorting image data into sort memory 315, read control 310 will use tail memory 360 to identify those tiles that do not have any of a frame's geometry sorted into them. This procedure is described in greater detail below in reference to read control 310 and FIG. 17.

In one embodiment of sort 215, tail memory 360 comprises one buffer, for example, buffer 361. In a preferred embodiment of the present invention, tail memory 360 includes one input buffer 361 and one output buffer 362 (input/output is hereinafter referred to as "i/o"). Either of the two buffers, 361 or 362, may at times operate as the input or output buffer. Each buffer, 361 or 362, occupies a separate address space in tail memory 360 The particular buffer (one of either of the two buffers) that, at any one time, is being written into by write control 305, is considered to be the input buffer. The particular buffer (the other one of two buffers) where data is being read out of it by read control 310, is considered to be the output buffer. When write control 305 swaps sorted memory 315, buffer 361 is also swapped with buffer 362. Swapping sort memory 315 is discussed in greater detail below with respect to write control 305, step 845, FIG. 8.

In yet another preferred embodiment of the present invention, after read control 310 finishes reading all of the geometry corresponding to a tile for the last time, ADDR HEAD 6005 is set to equal the start address of its respective linked list and ADDR TAIL 6010 is set to equal ADDR HEAD 6005 (see table 6).

Write Control 305

In one embodiment of the present invention, write control 305 performs a number of tasks, including, for example: (a) fetching image data from a previous stage of graphics pipeline 200, for example, mode extraction 415; (b) sorting image data with respect to regions in a 2-D window; (c) storing the spatial relationships and other information facilitating the spatial sort into sort memory 315.

In a preferred embodiment of the present invention, write control, in addition to performing the above tasks, provides a previous stage of graphics pipeline 200, for example, mode extraction 415, a guaranteed conservative memory estimate of whether enough memory in a sort memory 315 buffer is left to spatially sort the image data into sort memory 315. In this preferred embodiment, write control 305 also cooperates with the previous stage of pipeline 200 to manage new frames of image data and memory overflows as well, by sequencing sort memory 315 buffer swaps with read control 310. We will now discuss each of these various embodiments in detail.

To illustrate write control 305, please refer to the exemplary structure in FIG. 3 and the exemplary embodiment of the inventive procedure of write control 305 in FIG. 8. At step 810, sort 215 initializes tail memory 360 to contain an entry 6000 (see Table 6) for each linked list data structure in sort memory 315, such that Addr head 6005 equals Addr tail 6010 which equals the address of the beginning of each respective linked list data structure, and number of entries 6015 is set to equal zero.

Write control 305 procedure continues at step 815, where it fetches image data from a previous stage and pipeline 200, for example, mode extraction 415. Image data includes those packets that respectively designate either the beginning of a user frame, or the end of a "user frame" (including, begin frame packet 2000 (see Table 2) and end frame packet t 3000 (see Table 3), hereinafter, often collectively referred to as a "frame control packets"), mode packets (including clear packets 4000 and cull packets 4500 (see Table 4)), and spatial packets 6000 (see Table 6).

At step 820, write control 305 procedure determines whether a begin frame packet 2000 was received (step 815).

If write control 305 received a begin frame packet 2000 (step 815), it means that a new frame of image data packets are going to follow. In light of this, frame state parameters are stored into input I/O buffer, for example, buffer 351 or buffer 352, in frame state 350 (see FIG. 3). Such frame parameters are discussed in greater detail above.

Write control procedure 800 continues at step 825, where it is determined whether or not read control 310 is busy sending previously spatially sorted image data to a next stage in graphics pipeline 200. Write control 305 and read control 310 accomplish this by sending simple handshake signals over signal line 311 (see FIG. 3). If read control 310 is busy, then write control procedure 800 will continue waiting until read control 310 has completed.

At step 830, if read control 310 is idle, write control procedure 800 swaps the following: (a) buffers 0 and 1 in sort memory 315; (c) frames state registers 351 and 352; and, (c) buffers 361 and 362 in tail memory 360. After execution of step 830, read control 310 can begin reading the spatially sorted image data out of, what was the input buffer, but is now the output buffer, while in parallel, and write control 305 can begin to spatially sort new image data into, what was the output buffer, but is now the input buffer. (In one embodiment of the present invention, read control 310 will zero-out the contents of the buffer that it has finished using.)

In a preferred embodiment of the present invention, memory is swapped by exchanging pointer addresses respectively to read and write memory buffers. For example, in one embodimant, write control 305 sets a first pointer that references a read memory buffer (for example, buffer 1 (see FIG. 3)) to equal a start address of a first memory buffer that write control 305 was last sorting image data into (for example, buffer 0 (see FIG. 3)); and, (b) write control 305 sets a second pointer that references a write memory buffer (in this example, buffer 0) to equal a start address of a second memory buffer that read control 310 was last reading sorted image data from to a subsequent stage of pipeline 200 (in this example, buffer 1).

Step 835, write control process 800 retrieves another packet of image data from previous processing stage in pipeline 200, for example, mode extraction 415. (As discussed above with respect to step 820, if the previously fetched image packet was not a begin frame packet 2000 (step 820), write control procedure 800 also continues here, at step 835).

At step 840, it is determined whether the packet is an end of frame packet 3000 (see Table 3), for designating and end of frame of image data. This end of frame packet 3000 may have been sent as the result of a natural end of frame of image data (SoftEndFrame 3010), a forced end of frame, or as a result of a memory buffer overflow (BufferOverflowOccurred 3015), known as a split frame of image data.

In line with this, if the end of image frame was not a soft end of frame or user end of frame, write control 305 procedure continues at step 860, it is determined whether the packet is an end of user frame. An end of user frame means that the application has finished an image. An end of user frame is different from a "overflow" end of frame (or soft end of frame), because in an overflow frame the next frame will need to 'composite' with this frame (this is accomploshed in a subsequent stage of pipeline 200). In light of this, write control 305 procedure continues at step 815 where another image packet is fetched from a previous stage of pipeline 200, because there is more spatial data in this user frame.

At step 865, it is determined if read control 310 is busy sending image data that was already spatially sorted by write control 305 to a next stage in graphics pipeline 200. If read control 310 is busy, then write control 305 procedure will continue waiting until read control 310 has completed.

At step 870, if read control 310 is idle (not sending spatially sorted image data from an output sort memory 315 buffer to a subsequent stage and pipeline 200), write control 305 procedure swaps input memory buffers with output memory buffers, and input data registers with output the registers, including, for example, the following: (a) buffers 0 and 1 in sort memory 315; (c) frames state registers 351 and 352; and, (c) buffers 361 and 362 in tail memory 360.

After execution of step 830, read control 310 can: (a) begin reading the spatially sorted image data out of, what was the input buffer, but is now the output buffer; (b) determine the output frame of image data's state from what was the input set of frame state registers, but is now the output set of frame state registers; and, (c) manage the output memory buffers linked list data structures from what was the input tail memory buffer, but is now the output tail memory buffer. While, in parallel, and write control 305 continues at step 815, where it can begin to spatially sort new image data into, what was the output sort memory 315 buffer, but is now the input buffer.

At step 845 (the image packet received from the previous stage of pipeline 200 was not an end of frame packet 3000, see step 840), write control 305 uses a guaranteed conservative memory estimate procedure to approximate whether there is enough sort memory 315 to store the image data packet received from the previous stage of the pipeline, along with any other necessary information (step 835), for example, vertex pointers 5005, or mode pointers 5015 or 5020. Guaranteed conservative memory estimate procedure 845 is described in greater detail below in reference to FIG. II. Using this procedure 845, write control 305 avoids any problems that may have been caused by backing up pipeline 200 due to sort memory 315 overflows, such as, for example, loss of data.

If there's not enough memory (step 845) for write control 305 to spatially sort the image data, at step 850, write control 305 signals the previous stage of pipeline 200 over signal line 212 (see FIG. 2 or FIG. 3) to temporarily stop sending image data to write control 305 due to a buffer overflow condition. An example of a buffer overflow signal (srtOD_srtOverflow 1525) used by write control 305 is described in greater detail above in table 15 and in reference to section interface signals and the interface between sort 215 and mode extraction 415.

The previous stage of pipeline 200 may respond to the buffer overflow indication (step 850) with an end frame packet 3000 (see FIG. 3) that denotes that the current user frame is being split into multiple frames. In one embodiment of present invention, this is accomplished by setting BufferOverflowed 3015 to "1"

Sort 215 responds to this indication by: swapping sort memory 315 I/O buffers, for example, buffer 0 and buffer 1 (see FIG. 3); (b) frame state registers, for example, frame state registers 361 and frame state registers 362; and, (c) tail memory buffers, for example, tail memory buffer 351 and tail memory buffer 352.

In yet another embodiment of the present invention, where sort 215 is single buffered, it is the responsibility of a software application executing on, for example, computer 101 (see FIG. 1) to cause an end-of-frame to occur in the input data stream, preferably before sort memory 315 fills (step 845). In such a situation, write control 305 depends on receiving a hint from the software application, the hint indicating that sort 215 should empty its input buffer.

Figure 9:
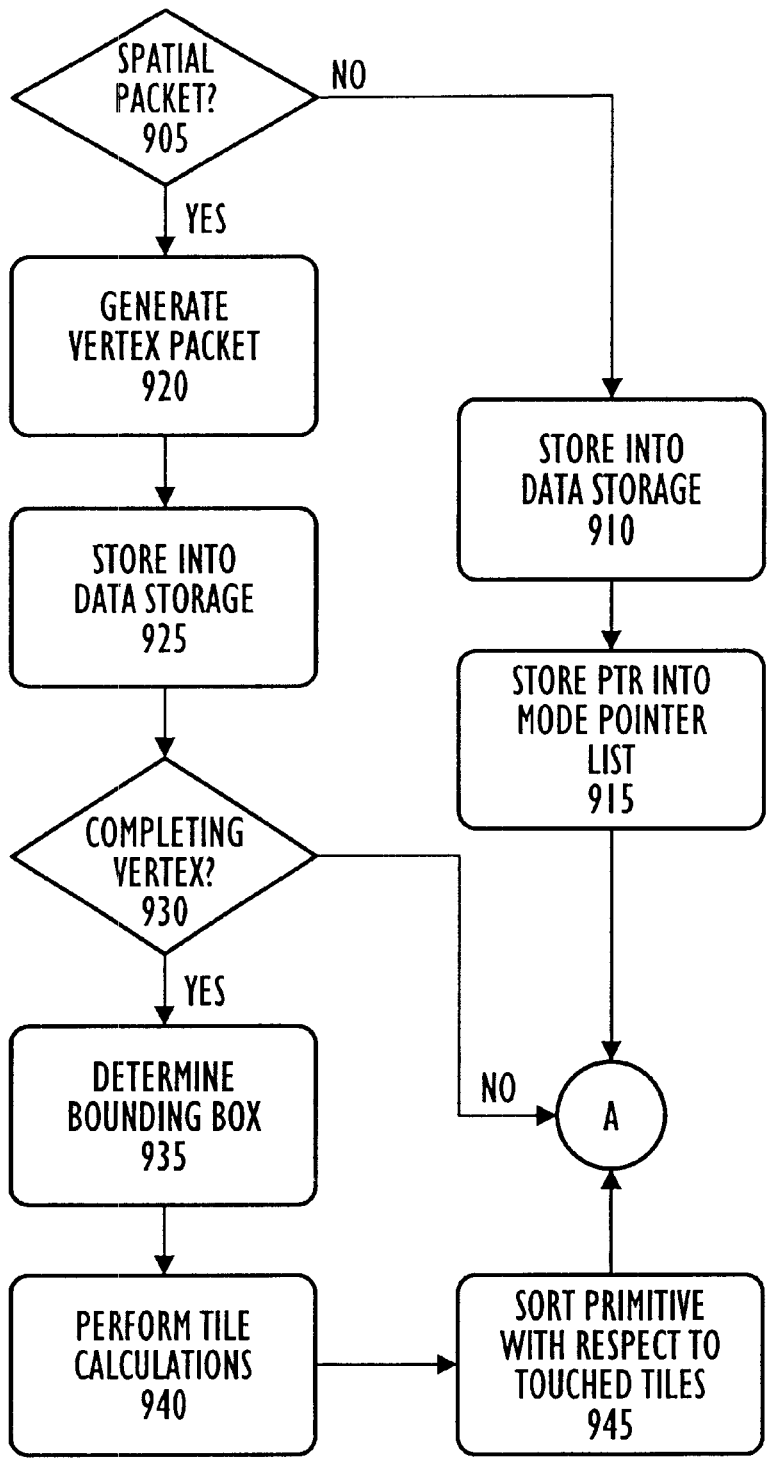
FIG. 9 is a flowchart illustrating aspects of write control 305 procedure, and in particular

If there is enough memory to spatially sort the image data (step 845), write control performs the following steps to store the image data as illustrated at step 905, in FIG. 9. Referring to FIG. 9, at step 905 it determined whether the packet is a spatial packet 1000 (see Table 8), and if it is not, at step 910, the packet must be a mode packet (either clear packet 4000 or cull packet 4500, see Table 4), the mode packet is stored into data storage input buffer, for example, data storage 320. At step 915, a pointer referencing the location of the mode packet in data storage is stored into mode pointer list input buffer, for example, mode pointer list 340.

If the packet was a spatial packet (step 905), at step 920, a vertex packet 8000 (see Table 8) is generated from the information in spatial packet 1000 (see Table 1). The value of each element in vertex packet 8000 correlates with the value of a similar element in spatial packet 1000. At step 925, the vertex packet 8000 is stored into a data storage input buffer, for example, data storage 320.

At step 930, it is determined whether the spatial packet 1000 (step 905) contains a completing vertex (the last vertex in the primitive). If the spatial packet 1000 contains a completing vertex (step 930), at step 935, to minimize bandwidth, write control 305 does a tight, but always conservative, computation of which tiles of the 2-D window are touched by the primitive by calculating the dimensions of a bounding box that circumscribes the primitive. The benefits of step 935 in this preferred embodiment, become evident in the next step, step 940. Bounding boxes are described below in greater detail in reference to FIG. 13.

At step 940, write control 305 performs touched tile calculations to identify those tiles identified by the bounding box (step 935) that are actually intersected by the primitive. Utilizing a bounding box to limit the number of tiles used in the touched tile calculations is beneficial as compared to the existing art, where touched tile calculations are performed for each tile in the 2-D window.

Not taking into consideration the notion of using a trivial reject and/or a trivial accept of tiles prior to the use of the touched tile calculations (use of a bounding box) (step 935), the notion of touched tile calculations per se are known in the art, and one particular set of touched tile calculations are included in Appendix A for purposes of completeness, and out of an abundance of caution to provide an enabling disclosure. These conventional touched tile procedures may be used in conjunction with the inventive structure and method of the present invention.

At step 945, for each tile that was intersected by the primitive (step 940), a vertex pointer 5005 (see Table 5) pointing to the vertex packet 8000 stored into data storage (step 925) is stored into each input buffer tile pointer list that corresponds to each tile that was intersected by the primitive (determined in step 935), for example, tile pointer list buffer 330, and tile 0 tile pointer list 331, and tile 1 tile pointer list 332. A greater detailed description of the procedures used to store packets and any associated pointers into sort memory 315 is given above in reference to section sort memory structure and organization, and FIG. 15.

Bounding Box Calculation

The present invention utilizes bounding boxes to provide faster tile computation processing (see step 940, FIG. 9) and to further provide memory use estimates to a previous processing stage of pipeline 200 (memory use it estimates are discussed in greater detail below in reference to guaranteed conservative memory estimate procedure X, FIG. X). We will now describe a procedure to build a bounding box that circumscribes a primitive, wherein the bounding box comprises at least one tile of a 2-D window divided into equally sized tiles.

Figure 13:
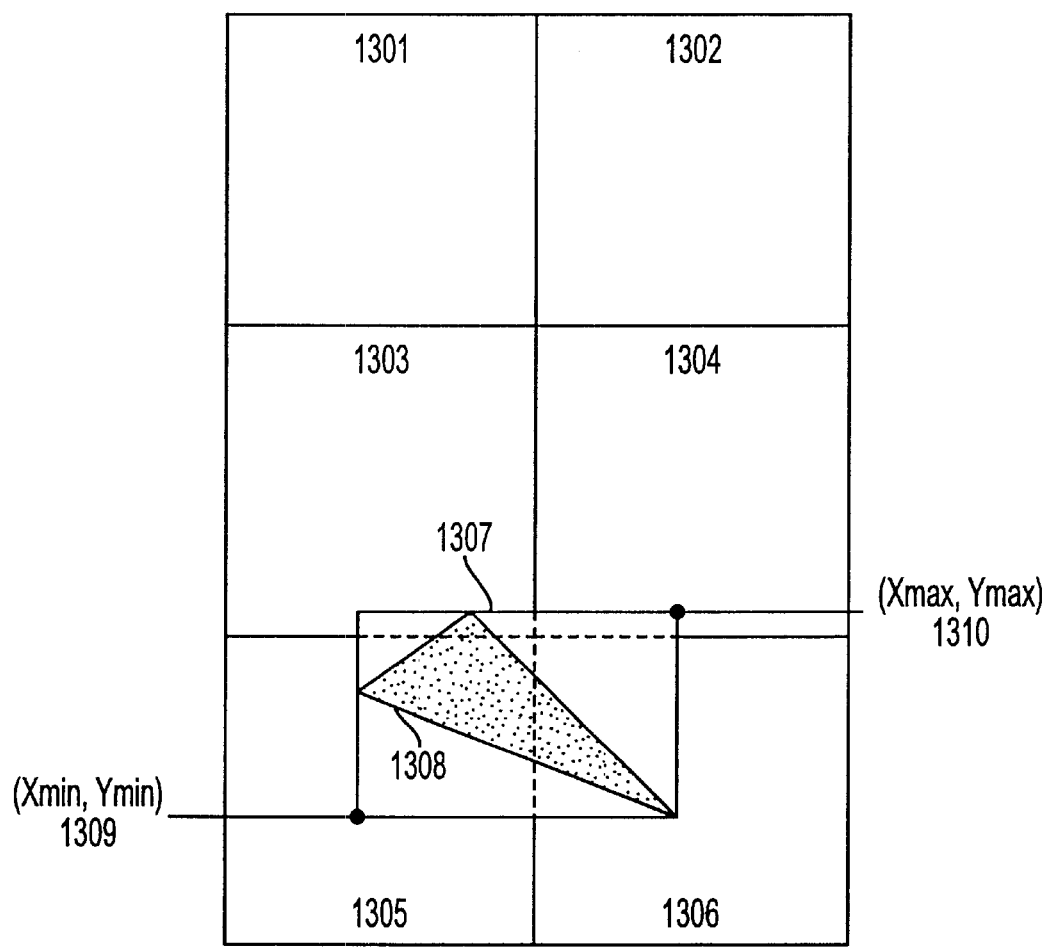
FIG. 13 is a block diagram illustrating aspects of a 2-D window divided into multiple tiles, the 2-D window depicting a a triangle circumscribed by a bounding box.

To illustrate the idea of a bounding box, please refer to FIG. 13, where there is shown a 2-D window 1300 with a bounding box 1307 circumscribing a triangle 1308. In this example, the 2-D window 1300 is divided horizontally and vertically into six tiles 1301, 1302, 1303, 1304, 1305, and 1306. The bounding box 1307 has dimensions including (Xmin, Ymin) 1309, and (Xmax, Ymax) 1310, that are used by write control 305 to determine a group of tiles in 2-D window 1300 that may be touched by the triangle 1308.

In this example, bounding box 1307 includes, or "touches" four tiles 1303, 1304, 1305, and 1306 of the six tiles 1301, 1302, 1303, 1304, 1305 and 1306, because the triangle 1308 lies on, or within each of the tiles 1303, 1304, 1305, and 1306. Bounding box 1307 provides a conservative estimate of the tiles that primitive 1308 intersects, because, as is shown in this example, the dimensions of bounding box 1307 includes a tile (in this example, tile 1304) that is not "touched" by geometry primitive 1308, even though tile 1304 is part of bounding box 1307.

Referring to Table 5, and in particular to vertex pointer 5005, we will now determine the coordinates of a primitive from its corresponding vertex pointer 5005, and second, determining dimensions of bounding box 1307 from the coordinates of the primitive. A procedure for determining the coordinates of a primitive from its corresponding vertex pointer 5005 is described in greater detail above with respect to vertex pointer 5005, and Table 5.

Having determined the coordinates (vertices) of the primitive, the magnitude of the vertices are used to define the dimensions of a bounding box circumscribing the primitive. To accomplish this, write control 305 compares the magnitudes of the primitive's vertices to identify bounding box's 1307 (Xmin and Ymin) 1309 and (Xmax and Ymax) 1310.

The use of a bounding box is beneficial for several reasons, including, for example, it over estimates the memory requirements, but it takes less computation then it would to calculate which tiles a primitive actually intersects.

Lines, line mode triangles, and points have a width that may cause a primitive to touch adjacent tiles and thus have an affect on bounding box calculations. For example, a single point can touch as many as four tiles. In a preferred embodiment of the present invention, before determining dimensions of bounding box 1307, one-half of the primitive's stated line width, as given by LinePointWidth 1010 (see Table 1), is added to the primitive's dimensions to more clearly approximate the tiles that the primitive may touch.

Guaranteed Conservative Memory Estimate

Guaranteed is used because we know an upper bound on the number of tiles, and we know how much memory a primitive requires for storing respective pointers and vertex data.

Hereinafter, guaranteed conservative estimate procedure 845 is referred to as "GCE 845."

GCE 845 is desirable because sort memory 315 is allocated by write control 305 as image data is received from a previous stage of pipeline 200, for example, mode extraction stage 415. Because sort memory 315 is an arbitrary but fixed size, it is conceivable that sort memory 315 could overflow while storing image data.

Figure 14:
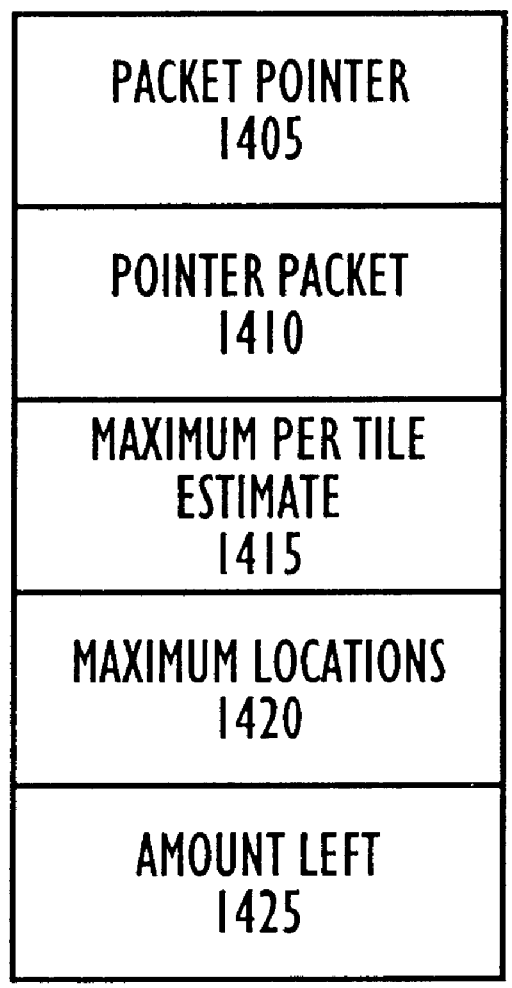
FIG. 14 is a block diagram illustrating aspects of a guaranteed conservative memory estimate data structure according to one embodiment of the present invention.

Referring to FIG. 14, there is shown a block diagram of an exemplary memory estimate data structure ("MEDS") 1400, that in one embodiment of the present invention, provides data elements that GCE 845 uses in its estimating procedure. MEDS can be stored in sort memory 315, or other memory (not shown). Packet pointer element 1405 references a first insertion point into a memory, the memory in this example is sort memory 315, to store a first incoming data element, in this example the incoming data element is either a vertex packet 8000 or a mode packet 4000 or 4500 from mode extraction 415. Pointer pointer element 1410 keeps track of a second insertion point into the memory to store any other incoming data elements, in this example, the other incoming data elements are vertex pointers 5005, or mode pointers 5010 that may be associated with the vertex packet 8000 or mode packet 4000 or 4500.

Maximum per tile estimate element 1415 represents a value that corresponds to a "worst case," or maximum number of memory locations necessary to store the largest primitive that could occupy the 2-D window. This largest primitive would touch every tile in the 2-D window. Memory left element 1425 represents the actual amount of sort memory 315 that remains for use by write control 305.

In yet another embodiment of the present invention, write control 305 uses memory estimate data structure 1400 to provide the information to respond to inquiries from a software application procedure, such as a 3-D graphics processing application procedure, concerning current memory status information, such as pointer write addresses.

Figure 11:
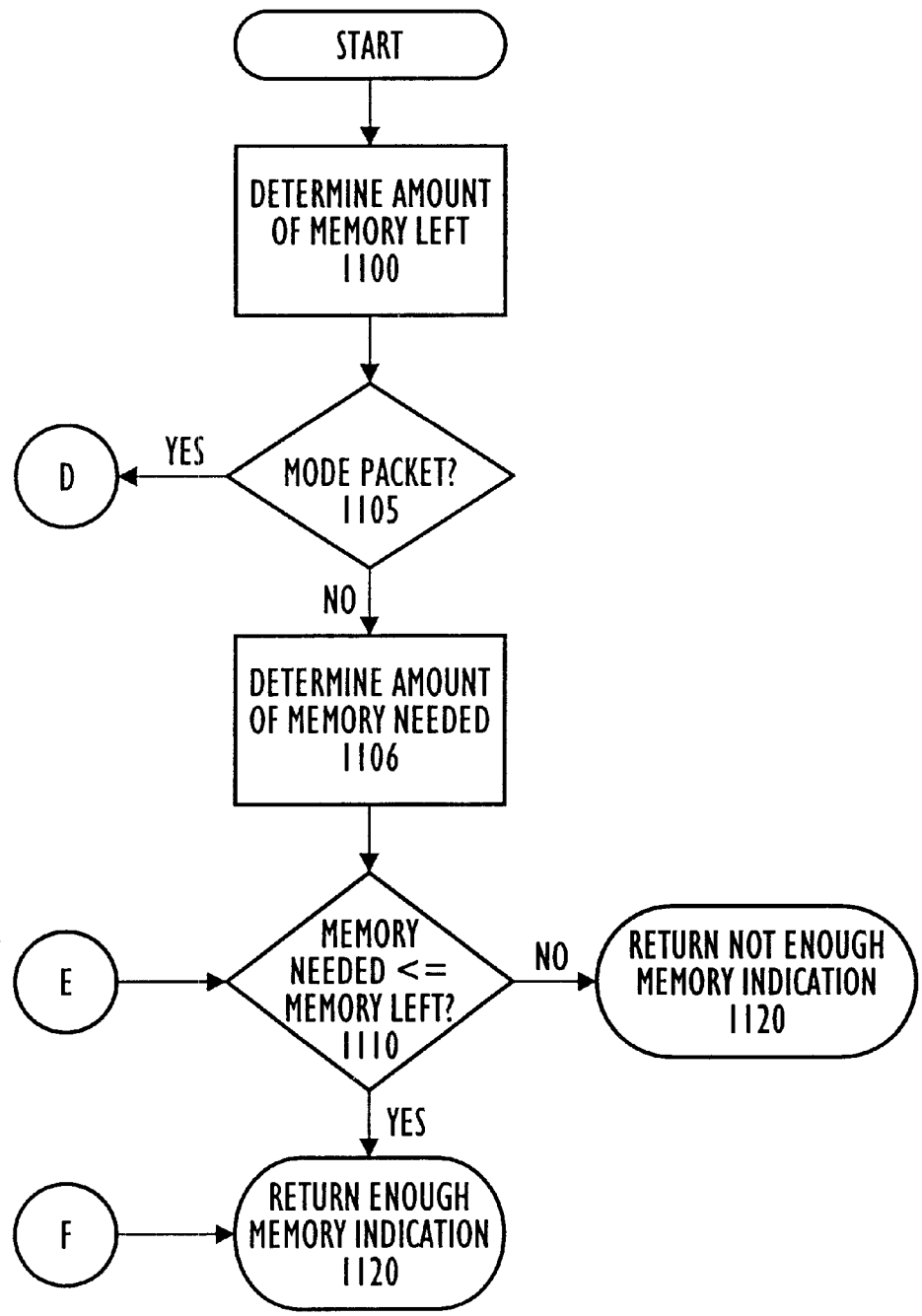
FIG. 11 is a flowchart illustrating aspects of guaranteed conservative memory estimate procedure according to one embodiment of the present invention.

Referring to FIG. 11, there is shown an embodiment of GCE 845. At step 1100, the actual amount of sort memory 315 that remains for use by write control 305 is calculated. We will now describe how this is accomplished. In one embodiment of the present invention, any pointers that may be associated with image data, such as vertex pointers 5005, are inserted into sort memory 315 at a first insertion point, or first address, that grows from the bottom up as new pointers are added to sort memory 315. Also, in this embodiment, packets associated with the image data, such as mode packets 4000 or 4500, and/or vertex packets 8000, are inserted into sort memory 315 at a second insertion point, or second address, that decreases from the top down as packets are added to sort memory 315, or vice versa.

The difference between the magnitudes of the first address and the second address identifies how much sort memory 315 remains. Hereinafter, the result of this calculation is referred to as memory left 1425.

In this example, at step 1105, GCE 845 determines if the input data packet is a mode packet 4000 or 4500, and if so, at step 1106, GCE 845 identifies the amount of sort memory 315 that is necessary to store a mode packet 4000 or 4500 into an input buffer of data storage (see FIG. 3), and an associated mode pointer (depending on the type of mode packet, either a clear mode packet pointer 5015 or a cull mode packet pointer 5020), into an input buffer mode pointer list, this amount is referred to as "memory needed." In one embodiment, memory needed is equivalent to the number of bytes of the packet, in this example, the packet is either a clear mode packet 4000 or a cull mode packet 4500, plus to number of bytes required to store and associated pointer, in this example a mode pointer (see Table 5, depending on the type of mode packet, either a clear mode packet pointer 5015 or a cull mode packet pointer 5020), into sort memory 315. (Sizes of packets and pointers are given in their respective tables. See Table 8 for vertex packets, Table 4 for mode packets, and Table 5 for each pointer type.)

Referring back to FIG. 11, at step 1110, GCE 845 compares memory needed to Memory Left 1425, and if memory needed is greater than memory left 1425, at step 3150, GCE 845 returns a not enough memory indication, for example, a boolean value of "false," so that the write control 305 can, for example, send a buffer overflow indication (see interface signals above) to a previous stage of the graphics pipeline, such as mode extraction 415. Otherwise, at step 1120, GCE 845 sets an enough memory indication for the write control 305, for example, returning a boolean value of "true".

Figure 12:
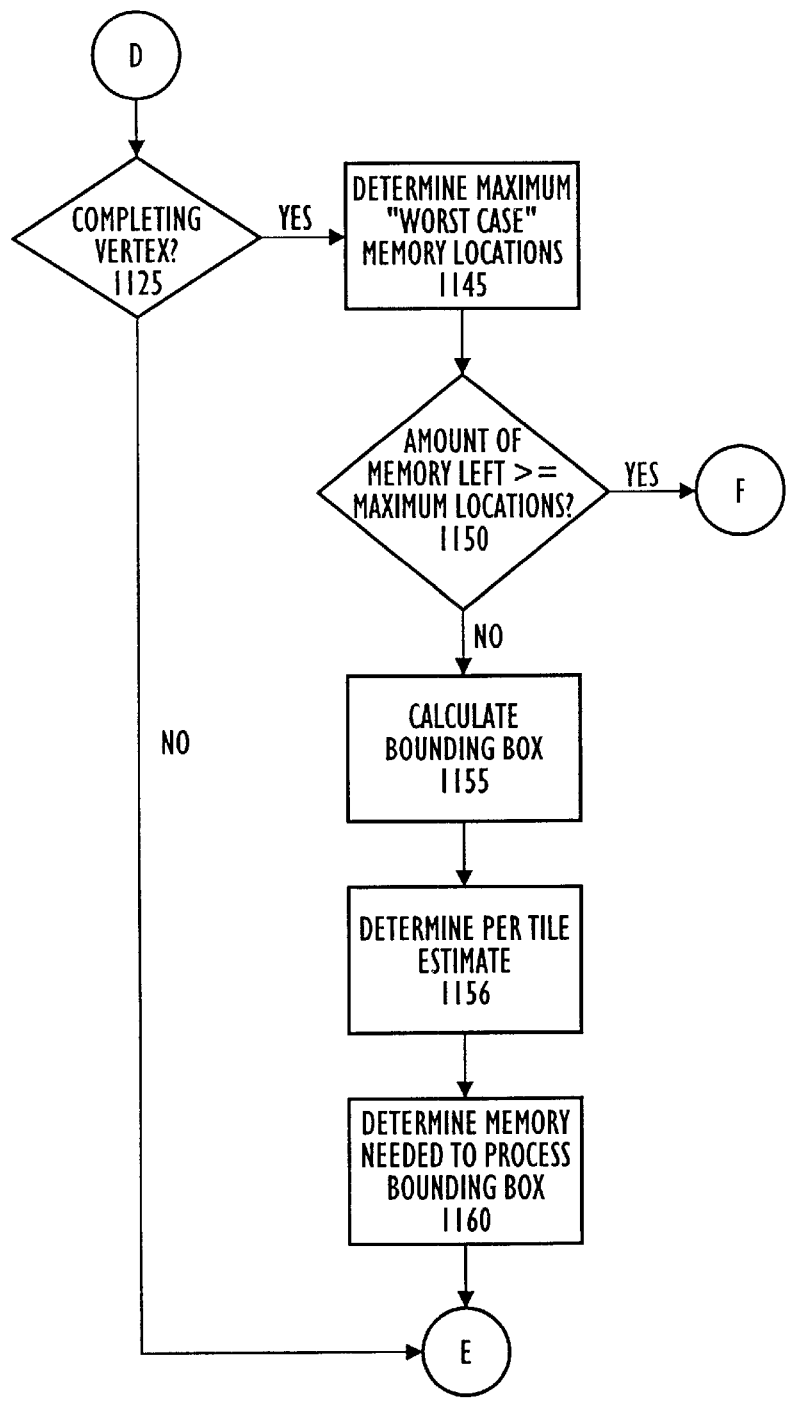
FIG. 12 is a flowchart illustrating aspects of guaranteed conservative memory estimate procedure according to one embodiment of the present invention.

If the image data was not a mode packet 4000 or 4500 (step 1105), then GCE 845 continues at step 1145, as illustrated in FIG. 12. Referring to FIG. 12, at step 1145, GCE 845 determines if the image data is a spatial packet 8000 that contains a completing vertex. To illustrate a Spatial Packet, please refer to Table 1, where there is shown an example of a Spatial Packet 1000.

If spatial packet 1000 contains a completing vertex (step 1125), at step 1145, GCE 845 determines the value of the maximum memory locations 1420 as discussed in greater detail above. At step 1150, if it is determined that memory left 1425 is greater than, or equal to maximum memory locations 1420, then the GCE 845 continues at F, as illustrated in FIG. 11, where at step 1120, GCE 845 sets an indication that there is for certain enough memory for the write control 305 to store the image data and any associated pointers into sort memory 315.

Otherwise, at step 1155 (FIG. 12), GCE 845 performs an approximation of the amount of sort memory 315 that may be required to process the input data packet 201 by determining the dimensions of a bounding box circumscribing the geometry primitive. A greater detailed description of bounding boxes is provided above in references to section Bounding Boxes.

At step 1156, GCE 845 determines Maximum Per Tile Estimate 1415 as discussed in greater detail above. At step 1160, the Maximum Per Tile Estimate 1415 is multiplied by the group of tiles identified by the bounding box 1307, to determine an estimate of the "memory needed" for write control 305 to store the spatial data and associated pointers for the geometry primitive. In an embodiment of the present invention, memory needed, with respect to this example, is equal to the number of bytes in a Vertex Packet 8000 plus the number of bytes in a corresponding Vertex pointer 5005. Next, GCE 845 continues at E, as illustrated in FIG. 11, where at step 1110, if memory needed is less than or equal to Memory Left 1425, then at step 1120 an "enough memory" indication is returned to the calling procedure, for example, write control 305 procedure (see FIG. 8). The indication shows that there is for certain enough memory for write control 305 to store the spatial data and associated pointers into sort memory 315. As discussed above, this indication can be as simple as returning a boolean value of "true". Otherwise, at step 1110, if memory needed is greater than memory left 1425, at step 1115, an indication is set showing that sort memory 315 could possibly overflow while storing the spatial data and associated pointers corresponding to this geometry primitive.

Other Processing Stages 240

In one embodiment of the present invention, other processing stages 240 (see FIG. 2) includes, for example, any other graphics processing stages as long as a next other processing stage 240 can receive image data that sorted with respect to regions of a 2-D window on a region-by-region basis.

Figure 5:
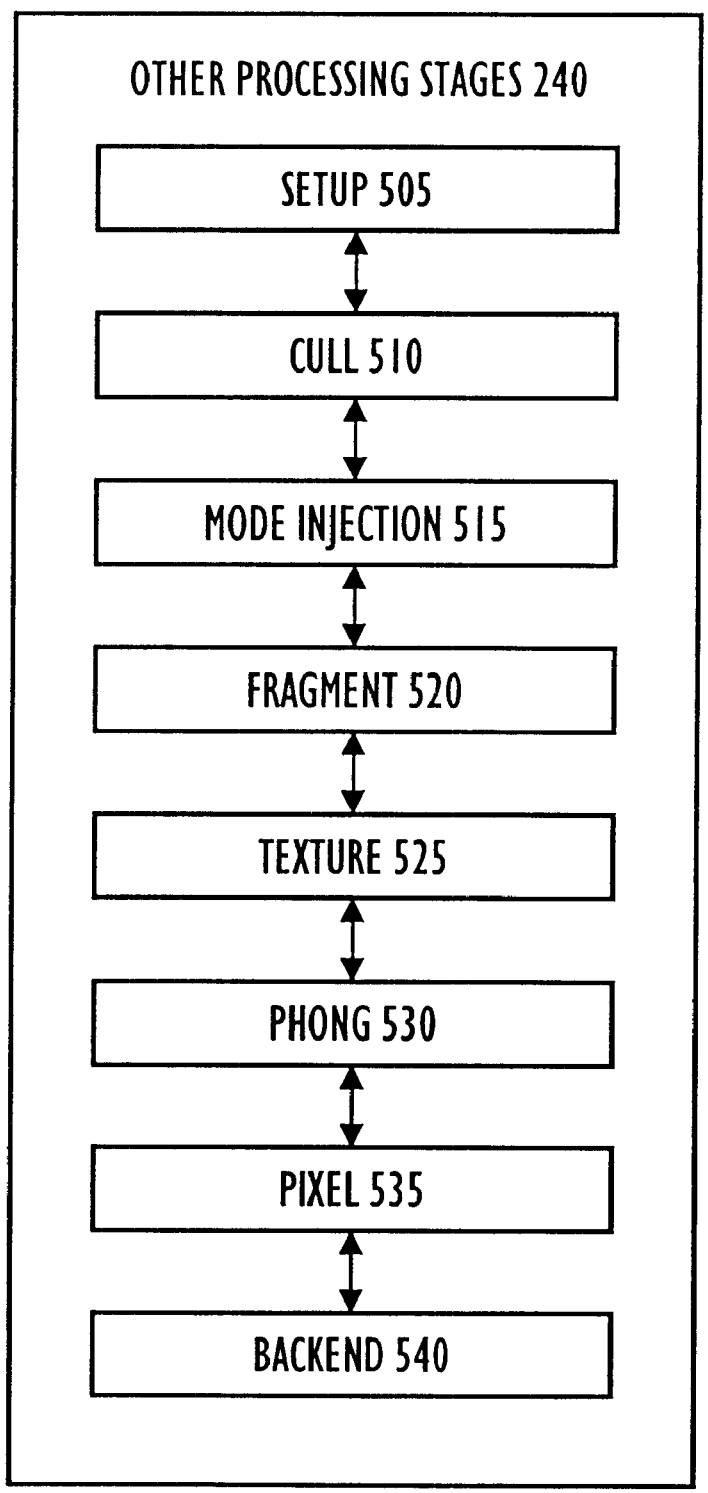
FIG. 5 is a block diagram illustrating an example of other processing stages 220 according to one embodiment of the graphics pipeline of the present invention.

Referring to FIG. 5, there is shown an example of a preferred embodiment of other processing stages 220, including, setup 505, cull 510, mode injection 515, fragment 520, texture 525, Phong Lighting 530, pixel 535, and backend 540. The details of each of the processing stages in other processing stages 240 is not necessary to practice the present invention. However, for purposes of completeness, we will now briefly discuss each of these processing stages.

Setup 505 receives sorted spatial data and mode data, on a region-by region basis from sort 215. Setup 505 calculates spatial derivatives for lines and triangles one region and one primitive at a time.

Cull 510 receives data from a previous stage in the graphics pipeline, such as setup 505, in region-by-region order, and discards any primitives, or parts of primitives that definitely do not contribute to the rendered image. Cull 510 outputs spatial data that are not hidden by previously processed geometry.

Mode injection 515 retrieves mode information (e.g., colors, material properties, etc . . . ) from polygon memory, such as other memory 235, and passes it to a next stage in graphics pipeline 200, such as fragment 520, as required. Fragment 520 interprets color values for Gouraud shading, surface normals for Phong shading, texture coordinates for texture mapping, and interpolates surface tangents for use in a bump mapping algorithm (if required).

Texture 525 applies texture maps, stored in a texture memory, to pixel fragments. Phong 530 uses the material and lighting information supplied by mode injection 525 to perform Phong shading for each pixel fragment. Pixel 535 receives visible surface portions and the fragment colors and generates the final picture. And, backend 139 receives a tile's worth of data at a time from pixel 535 and stores the data into a frame display buffer.

In a preferred embodiment of the present invention, sort 215 is situated between mode extraction 415 (see FIG. 3) and setup 505 (see FIG. 5).

Interface Between Spatial Sorting 215 and Setup 405

Referring to Table 13, there is shown an example of primitive packet 13000. The majority of output from sort 215 to a subsequent stage of pipeline 200, is a sequence of primitive packets 13000 that contain sets of 1, 2, or 3 vertices.

Sort 215 also sends clear packets 4000 to a subsequent stage in pipeline 200. Clear packets 4000 is described in greater detail above in reference to the interface between sort 215 and mode extraction 415.

Referring to Table 11, there is shown in example of an output cull packet 11000. Read control 310 send all cull packet down stream unless its after the last vertex packet 8000 or clear packet 4000 in the tile.

Referring to Table 9, there is shown in example of begin tile packet 9000. Read control 310 may make multiple passes with regard to the image data corresponding to a particular tile because of: (a) multiple target draw buffers—for example front as well as back or left as well as right in a stereo frame buffer, and/or, (b) it may contain transparent geometry while pipeline 200 is operating in sorted transparency mode. Sorted transparency mode is discussed in greater detail below in reference to read control 310 procedure.

Sort 215 outputs this packet type for every tile in the 2-D window that has some activity, meaning that this packet type is output for every 2-D window that either has an associated buffer clear (see Table 4, clear packet 4000), or rendered primitives.

Referring to Table 10, there is shown an example of an end tile packet 10000 for designating that all of the image data corresponding to a particular tile has been sent.

Interface Signals

Referring to Table 18, there is shown interface signals and packets between sort 215 and setup 405, including srtOD_writeData signal 1805, indicating that data on mode extraction 415 data out bus 211 is a valid packet.

StpOD_stall signal 1815 indicates that setup 505's input queue is full, and that sort 215 should stop sending data to setup 505. Signal stpOD_transEnd 1820 indicates that sort 215 should stop re-sending a transparency sub-tile in sorted transparency mode. Setup 405 sends the signal because a downstage culling unit of pipeline 200 has determined that it has finished with all transparent primitives in the tile. Sorted transparency mode is described in greater detail below with regard to read control 310.

It can be appreciated that the specific values selected to represent each of the immediately above discussed signals are not necessary to practice the present invention. It is only important that each signal has such a unique value with respect to another signal that each signal can be differentiated from each other signal by sort 215 and setup 405.

Read Control 310

At this point, write control 305 has processed either an entire frame, or a split frame, of spatial and mode data, and spatially sorted that image data, vertex by vertex and mode by mode, on a tile-by-tile basis, in time-order, into sort memory 315. We will now discuss a number of embodiments of read control 310, used by sort 215 to output the spatially sorted image data to a subsequent process of pipeline 200. We will first discuss how read control 310 balances the effects of scene and horizon complexity, such that loads across the subsequent stages of pipeline 200 are more evenly balanced, resulting in more efficient pipeline 200 processing. This pipeline 200 load balancing discussion will introduce several new concepts, including, for example, the concepts of "SuperTile tile organization" and a "SuperTile Hop Sequence".

Next, we will describe how a preferred embodiment of read control 310 builds primitive packets 13000 from the spatially sorted image data in sort memory 315. Next, we will discuss a number of different modes that the spatially sorted image data can be sent down pipeline 200 according to the teachings of the present invention, for example, in-time order mode and sorted transparency mode. Finally, we will discuss an embodiment of a read control 310 procedure used to send the image data to a subsequent stage of pipeline 200.

Graphics Pipeline Load Balancing

As discussed above in reference to the background, significant problems are presented by outputting image data to a next stage of a graphic pipeline using a first-in first-out (FIFO), row-by-row, or column-by-column strategy. Outputting image data in such a manner does not take into account how scene complexity and/or horizon complexity across different portions of an image may place differing loads on subsequent stages of a graphics pipeline, possibly resulting in bottlenecks in the pipeline, and therefore, less efficient pipeline processing of the image data. It is desirable to balance these scene and horizon complexity effects across the subsequent rendering resources of pipeline 200, (for example, see FIG. 5).

To accomplish the goal of balancing rendering resources across pipeline 200, a preferred embodiment of read control 310: (a) organizes the tiles of the 2-D window (according to which write control 305 spatially sorted the image data ) into a SuperTile based tile organization; and, (2) sends the SuperTiles to a subsequent stage in pipeline 200 in a spatially staggered sequence, called the "SuperTile Hop Sequence." Such load balancing also has an additional benefit of permitting a subsequent texture stage of pipeline 200, for example, texture 525 (see FIG. 5), to utilize a degree of texture cache reuse optimization.

SuperTiles

To illustrate the idea of a SuperTile, refer to FIG. 18, where there is shown an example of a SuperTile, and in particular, a block diagram of a 2×2 SuperTile 1802 composed of four tiles. A SuperTile 1802 can be one tile, or any number of tiles. The number of SuperTiles 1802 in a SuperTile row 1803 in an array of SuperTiles 1801, need not be the same as the number of tiles in a SuperTile column 806.

In one embodiment of the present invention, the number of tiles per SuperTile 1802 is selectable, and the number of tiles in a SuperTile 1802 may be selected to be either a 1×1, a 2×2, or a 4×4 group of tiles. The number of tiles in a SuperTile 1802 is selected by either a graphics device driver or application, for example, a 3-D graphics application executing on computer 101 (see FIG. 1). The number of tiles in a SuperTile 1802 can also be preselected to match typical demands of a target application space.

In a preferred embodiment the number of tiles in a SuperTile is 2×2. For example, the present invention contemplates that the number of tiles in a SuperTile is selected such that the complexity of an image is balanced. Depending on the particular image, or target application space, if SuperTiles contain too many tiles they will contain simple as well as complex regions of the image. If a SuperTile size does not contain enough tiles, the setup cost for rendering a tile is not amortized by subsequent stages of pipeline 200. Such amortization includes, for example, texture map reuse and pixel blending concerns.

SuperTile Hop Sequence

In a preferred embodiment of the present invention, read control 310 reads SuperTiles 1801 out of sort memory 315 is a spatially staggered sequence, hereinafter referred to as the "Super Tile Hop Sequence," or "SHS," to better balance the complexity of sub-sequences of tiles being sent to subsequent stages of pipeline 200. In other words, in this embodiment, read control 310 does not send image data from sort memory 315 to a subsequent stage in pipeline 200 in such a manner that SuperTiles 1801 fall in a straight line across the computer display window, as illustrated by tile order, on either a row-by-row or a column-by-column basis. The exact order in the spatially staggered sequence is not important, as long as it balances scene and horizon complexity.

Referring to FIG. 18, SuperTile array 1801 is a 9 row×7 column array of 2×2 tile SuperTiles. Because, in this example, the SuperTile size is 2×2 tiles, SuperTile array 1801 contains 63 SuperTiles, or an 18×14 array of tiles, or 1605 tiles. Read control 310 converts SuperTile array 1801 into a linear list 1803 by numbering the SuperTiles 1802 in a row-by-row manner starting in a corner of the 2-D window of tiles, for example, the lower left or the upper left of the SuperTile matrix 1801. In a preferred embodiment, the numbering starts in the upper left of a 2-D window of SuperTiles.

Next, read control 310 defines the sequence of SuperTile processing as:

$T_0 = 0$, $T_{n+1} = \text{mod}_N(T_n + M)$,

The requirement of "M" is that it be relatively prime with respect to N. It is not required that M be less than N. In this example, "M" is 13, because it a relatively prime number with respect to N in this example, or 63. Where N=number of SuperTiles in a window, M=the SuperTile step, and Tn=nth SuperTile to be processed, where 0<=n<=N−1. In this example N=63 (length & width), and M=13. This results in the sequence: $T_0=0$, $T_1=13$, $T_2=26$, $T_3=39$, $T_4=52$, $T_5=2$, $T_6=15$, as illustrated in tile order 1804, which shows the resulting SuperTile Hop Sequence.

This algorithm, the SuperTile Hop Sequence, creates a pseudo-random sequence of tiles, whereas scene and horizon complexity tends towards the focal point of the image, or the horizon.

This iterative SuperTile Hop Sequence procedure will hit every SuperTile 1802 in a 2-D window as long as N and M are relatively prime (that is, their greatest common factor is 1). Neither N nor M need to be prime numbers, but if M is always selected to be a prime number, then every Super Tile will be hit. When one or both of N or M are not prime, then portions of the scene would never be rendered by subsequent stages of pipeline 200. For example, if "N" were set equal to 10 and "M" were set to equal 12, no odd numbered SuperTiles would be rendered.

In a preferred embodiment, a SuperTiles array is larger than needed to cover an entire 2-D window, and is assumed to be $2^a \times 2^b = 2^{2a+b}$, where "a" and "b" are positive integers, and where "a" can equal "b", thus guaranteeing the total number of SuperTiles in the SuperTile array to be an integer power of two. Having the total number of SuperTiles be an integer power of two simplifies implementation of the Modulus operation in a finite hardware architecture where numbers are represented in base 2.

This makes it possible to do "$\text{mod}_N$" calculation simply by throwing away high order bits. Using this approach, nonexistent, or fictitious SuperTiles 1802 will be included in the SHS and, in a preferred embodiment of the invention, they are detected and skipped during Read control 310, because there is no frame geometry within the tiles. Detecting such non-existent, or fictitious SuperTiles 1802 can be done through the use of scissor windows where the dimensions of the scissor window equals the actual dimensions of the 2-D window. In such a situation read control 310, discussed in greater detail below, does not output those tiles, or SuperTiles that fall completely outside the scissor window.

Figure 7:
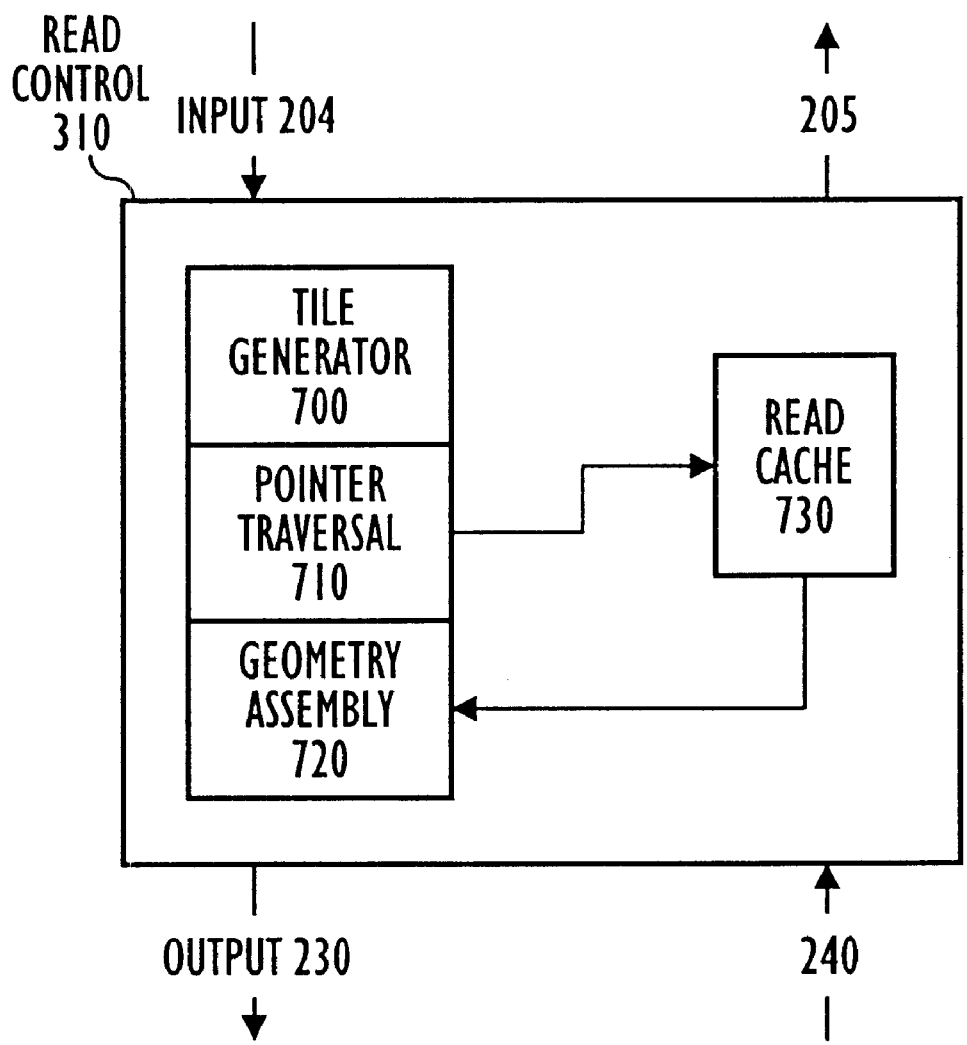
FIG. 7 is a block diagram of read control 310 according to one embodiment of the present invention.

Referring to FIG. 7, there is shown an illustration of an exemplary read control 310 circuit, for reading data out of sort memory 315. Read control 310 may be configured to include the following circuits: (a) Tile Generator Circuit 700, for grouping tiles into SuperTiles and determining a SuperTile Hop Sequence order that the SuperTiles should be sent out to a next stage in the graphics pipeline, such as setup 505; (b) Pointer Traversal Circuit 710, for traversing a 2-D windows' mode pointer lists and tail pointer lists to populate read cache 730 on a tile-by-tile basis, wherein each tiles' spatial data is stored in time-order; and (c) geometry assembly circuit 720, for constructing output primitive packets 13000 (see Table 13), and accumulating clear mode packets 4000 (see Table 4) before sending the spatial and mode data, on a tile-by-tile basis to the next stage in graphics pipeline 200. the functionality of each of these circuits 700, 710, 720 and 730 are discussed in greater detail below with reference to FIG. 17.

Read Control Procedure

In operation, read control 310: (a) selects the next tile to be sent to a subsequent processing stage of pipeline 200; (b) reads the final vertex pointer 5005 address from current tail memory 360 for the chosen tile; (c) tests the final vertex pointer 5005 and mode pointer X to determine if the tile can be discarded except; (d) if the tile is not discarded, read control 310 proceeds to traverse the current tile pointer list to find the addresses of the vertices of the primitives that touch the tile; (e) the vertex data are read as needed, and primitives are assembled into primitive 13000 (see Table 13) packets and passed to a subsequent processing stage of pipeline 200. In a preferred embodiment of the present invention, the subsequent processing stage is setup 505 (see FIG. 5).

In one embodiment of the present invention, image data corresponding to tiles are re-sent to a subsequent stage of pipeline 200 if primitives are rendered to both front and back buffers, such as, for example, when the user or 3-D graphics application executing on, for example, computer 101 (see FIG. 1), requests this.

In a preferred embodiment of the present invention, image data corresponding to tiles are re-sent to a subsequent processing stage of pipeline 200, under some circumstances, for example, when pipeline 200 is in sorted transparency mode. Sorted transparency mode is discussed in greater detail below.

In yet another embodiment of the present invention, read control 310 performs two primary optimizations. The first, tiles that are not intersected by any primitive or clear packet 4000 are not sent to the subsequent stage of pipeline 200. Second, the address of the current vertex is compared to the address of the current mode packet to determine if the mode packet should be merged into the output stream, in this manner, clear buffer events that occur before any geometry are compressed where possible. This is beneficial because it reduces the bandwidth of image data to subsequent stages of pipeline 200.

In yet another preferred embodiment if the present invention, read control 310 starts reading spatially sorted image data from a buffer in sort memory 315 that was immediately prior to read control 310's step of beginning to read, designated for writes by write cotnrol 305.

Figure 17:
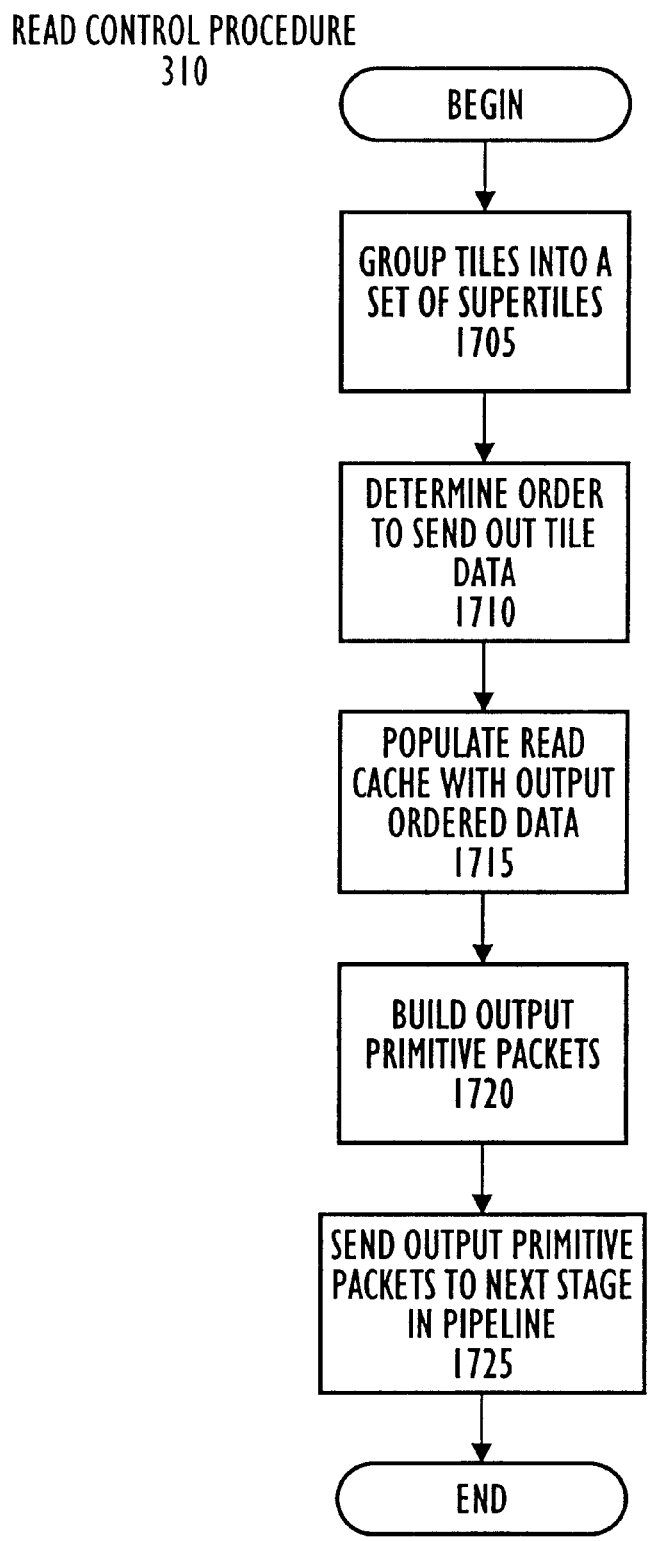
FIG. 17 is a flowchart illustrating aspects of Reed control 310 procedure according to one embodiment of the present invention; and, FIG. 18 is a block diagram illustrating aspects of a super tile hop sequence for sending tile relative data to a subsequent stage of the graphics pipeline, and for illustrating aspects of a supertile according to one embodiment of the present invention.

Referring to FIG. 17, we will now describe an example of read control 310 procedure.

At step 1705, the array of tiles representing the spatial area of the 2-D window are grouped into an array of SuperTiles 1803. Supertiles 1802 are discussed in greater detail above in reference to FIG. 18. At step 1710, the SuperTile Hop Sequence order for sending out the Super-Tiles to a next stage in graphics pipeline 200 is determined. The Supertile Hop Sequence is described in greater detail above in reference to FIG. 18.

At step 1715, read control 310 (1) orders packets (vertex packets X and mode packets 4000 and 4500), on a tile-by-tile basis, in an in-time order manner, from sort memory 315; and, (2) writes them, into a queue, read cache 730.

To order the packets in an output sort memory buffer, for example, buffer 1 (see FIG. 3), the following must be taken into consideration. A single mode packet 4000 or 4500 may affect multiple tiles, as well as multiple primitives within any one particular tile. Any one buffer in sort memory 315, for example, buffer 0 or buffer 1 (see FIG. 3), contains a single mode pointer list, for example, mode pointer list 340. Mode packets X are not sorted by write control 305 into sort memory 315 on a tile-by-tile basis, but only in an in-time order into an input data storage buffer, for example, data storage 320 (see FIG. 3). Thus, a single mode packet X may affect multiple tiles, as well as multiple primitives within any one particular tile. It is desirable that read control 310 map each particular mode packet X to those tiles that it effects, and that read control 310 only output a mode packet that effects the primitives in a particular tile, only once per that particular tile, as compared to outputting a mode packet that effects the primitives in a tile once per primitive per tile.

To achieve this goal and to populate read cache 730 (step 1715), read control 310 compares the address of each vertex pointer 5005 (in each input buffer tile pointer list) to the address of each mode pointer 4000 or 4500 in the single input buffer mode pointer list. (Referring to FIG. 3, the input buffer tile pointer lists could be, for example, tile 0 tile pointer list 331, tile 1 tile pointer list 332, tile 2 tile pointer list 333, and tile N tile pointer list 334. The input buffer mode pointer list could be, for example, mode pointer list 340). If the address of a mode pointer 4000 or 4500 is greater than the address of a vertex pointer 5005, the mode pointer 4000 or 4500 came before vertex pointer 5005. If the address of a vertex pointer 5005 is greater than the address of a mode pointer 4000 or 4500, the vertex pointer 5005 came before the mode pointer 4000 or 4500.

Whichever pointer was written into sort memory 315 first, indicates that the pointer's corresponding packet in the input data storage buffer (for example, see FIG. 3, data storage 320), either a vertex packet 5005 or mode packet 4000 or 4500, should be sent out of read control 310 to a subsequent processing stage of pipeline 200 before the packet that was determined to have been written into the input data storage buffer subsequent. Using this procedure, each mode packet 4000 or 4500 that affects a tile is output only one time, for the tile that it effects.

This explanation assumes that pointers are written by write control 305 into sort memory 315 from the bottom of sort memory 315 towards the top of sort memory 315 pointers are written by write control 305 from the top-down, the reverse of the above explanation applies.

In a preferred embodiment of the present invention, to write the packets into read cache 730, in preferred embodiment of the present invention, read control 310 will try to minimize the amount of extraneous data sent to subsequent stages of pipeline 200 by not sending out tiles that are empty of primitives. To accomplish this, read control 310 uses the output tail memory 360 buffer, either 361 or 362 (see FIG. 2), to identify those tiles in the 2-D window that do not contain primitives. For example, if an address of an output buffer tile pointer list (see ADDR HEAD 6005, FIG. 6), equals the address of a corresponding tail address X (see ADDR TAIL 6010, Table 6) in tail memory 360, then that particular tile does not have any primitives sorted into it by write control 305 (it is empty of any frame geometry). Therefore, read control 310 will not any data for that particular tile to subsequent stages of pipeline 200.

In yet another preferred embodiment of the present invention, read control 310 will minimize the amount of extraneous data set to subsequent stages of pipeline 200 by not sending our fictitious files. A fictitious tile is a tile that is empty of frame geometry that was previously created by read control 310 during SuperTile tile organization discussed in great detail above, wherein the number of tiles and the 2-D window may be have been increased by power of two.

To accomplish this goal, read control 310 will create a scissor window having the actual coordinates of the 2-D window. Referring to Table 14, there is shown in example of a scissor window data structure, for storing the coordinates of the scissor window.

Enable 1405 designates whether read control 310 should the scissor window. Enable 1405 set to equal "1" designates that read control 310 should use the scissor window defined therein. Xmin 1410, Xmax 1415, Ymin 1420, and Ymax 1425 are used to define the minimum and maximum coordinates defining the dimensions of the scissor window. In a preferred embodiment of the present invention, scissor window data structure 14000 is stored in, for example, sort memory 315 (see FIG. 3), or other memory (not shown).

In yet another preferred embodiment of the present invention, read control 310 will minimize the amount of extraneous data set to subsequent stages of pipeline 200 by not sending out fictitious files. A fictitious tile is a tile that is empty of frame geometry that was previously created by read control 310 during SuperTile tile organization discussed in great detail above, wherein the number of tiles and the 2-D window may have been increased by power of two.

To accomplish this goal, read control 310 will create a scissor window having the actual coordinates of the 2-D window. Referring to table. 14, there is shown in example of a scissor window data structure, for storing the coordinates of the scissor window.

Enable 1405 designates whether read control 310 should the scissor window. Enable 1405 set to equal "1" designates that read control 310 should use the scissor window defined therein. Xmin 1410. Xmax 1415, Ymin 1420, and Y max 1425 are used to define the minimum and maximum coordinates defining the dimensions of the scissor window. In a preferred embodiment of the present invention, scissor window data structure 14000 is stored in, for example,sort memory 315 (see FIG. 3), or other memory (not shown).

In this preferred embodiment, read control 310 will discard any tiles that lie completely outside of this scissor window. Those tiles that are situated partially inside and outside of the scissor window are not discarded.

In yet another embodiment of the present invention, scissor window data structure 14000 includes link 1430, for pointing to a next scissor window data structure 14000. In this embodiment, read control 310 utilizes a singly linked list of scissor window data structures 14000 to define multiple scissor windows. Linked list data structures and the operation of linked list in structures are known, and for that reason are not discussed in greater detail herein.

Is contemplated that these multiple scissor windows are utilized to discern which tiles comprising the 2-D window need to be rendered and which do not, thereby enabling the present invention to send only those image data that represent the visible portions of a window down stages of a graphics pipeline, while discarding those image data, or fictional image data that do not contribute to the visible portions of the window.

When read control 310 determines that the vertex data corresponding to vertex pointer 5005 should be stored into read cache 703, read control 310 generates pointer references to any vertex packets 5005 in Data Storage that may be necessary to assemble the complete geometry primitive, and stores the pointer references into read cache 703. The procedure for identifying each of a primitive's remaining vertices, if any, from vertex pointer 5005 is described in greater detail above in reference to vertex pointers 5005 and Table 5.

In light of that procedure, read control 310 generates pointer references to store into read cache 703 according to the following rules, if offset 5007 represents a point, no additional vertices are needed to describe the primitive, thus read control 310 only writes the address of a single vertex pointer 5005 into read cache 703. If the offset 5007 represents a line segment, another vertex is needed to describe the line segment and read control 310 first writes vertex pointer 5005 with the address of vertex pointer 5005 minus 1 into read cache 703, then writes the address of vertex pointer 5005 into read cache 703 If the offset 5007 represents a triangle, two more vertices are needed to describe the triangle, and read control 310 first writes the following pointers into read cache 703, in this order: (1) the address of vertex pointer 5005 minus the value of the offset; (2) the address of vertex pointer 5005 minus 1; and, (3) the address of vertex pointer 5005.

As read control 310 populates read cache 703 with each tiles' respective image data, the order that each primitive in the tile is read into Read Cache 703 is governed according to whether read control 310 is operating in either "Time Order Mode," or "Sorted Transparency Mode." In Time Order Mode (the default mode for one embodiment of the present invention), Read control 310 preserves the time order of receipt of the vertices and modes within each tile as the data is stored. That is, for a given tile, vertices and modes are read into Read Cache 703 in the same order as they were written into sort memory 315 by write control 305.

Sorted Transparency Mode

In sorted transparency mode, read control 310 reads each tile's data in multiple passes into read cache 703. In the first pass, read control 310 outputs "guaranteed opaque" geometry. In this context, guaranteed opaque means that the geometry primitive completely obscures more distant geometry that occupies the same area in the window. In subsequent passes, read control 310 outputs potentially transparent geometry. Potentially transparent geometry is any geometry that is not guaranteed opaque. As discussed above, within each pass, the geometry's time-ordering is preserved and mode data (contained in the mode packets) are inserted into their correct time-order location.

In one embodiment of the present invention, each vertex pointer 5005 includes the transparent element 5008 (see Table X). Transparent element 5008 is a single bit, where "0" represents that the primitive is guaranteed to be opaque, and where "1", represents that the corresponding primitive is treated as possibly transparent.

Clear packet 4000 includes an indication, SortTransparentMode 4010 (see Table 4), of whether the read control 310 will operate in time order mode, or sorted transparency mode. In one embodiment of the present invention, if SortTransparentMode 4010 is set to equal "1", then read control 310 will operate in time order mode. In this embodiment, if SortTransparentMode 4010 is set to "0", then read control 310 will operate in sorted transparency mode.

Referring to FIG. 17, at step 1720, read control 310 uses each vertex pointer 5005 and each mode pointer (depending on the type of mode packet, either a clear mode packet pointer 5015 or a cull mode packet pointer 5020) stored in read cache 703 to access each particular pointer's respectively referenced packet in data storage.

In the process of reading the pointers out of read cache 703, read control 310 accumulates each clear packet 4000 that it encounters. The process of accumulating clear mode packets 4000 is advantageous because it reduces the image data bandwidth to subsequent stages of pipeline 200, such as, for example, those operations stages identified in FIG. 5. Clear packets 4000 are accumulated until either a vertex pointer 5005 referencing a completing vertex is read from read cache 703, or a particular clear packet 4000 includes a "send now" field (SendToPixel 4008) that is set to, for example, "1," and indicates that particular packet needs to be sent immediately. When read control 310 encounters either one of these two situations, read control 310 sends any accumulated clear packets 4000 to a next stage in the graphics pipeline, for example setup 505.

In one embodiment of the present invention, multiple adjacent sort output cull packets 11000 (see table 11) are compressed into one sort output cull packet by a cull register (not shown). In essence, the cull register logically ors each CullFlushAll bits 11010 from the multiple output cull packets 11000, and uses the last packets for all other parameters. This is beneficial because it allows a subsequent stage of pipeline 200, for example cull 510 to be turned off for some geometry without affecting the subsequent status process with respect to tiles that do not contain the geometry.

Referring to Table 13, there is shown an example of an exemplary output primitive packet 13000, for sending to a next stage in the graphics pipeline. For each vertex pointer 5005 read out of read cache 703, read control 310 generates an output primitive packet 13000. To accomplish this, read control 310 will accumulate each primitive's vertices, where each vertex is stored in a corresponding vertex packet 5005 in data storage, into a respective output primitive packet 13000. As discussed above, each vertex pointer 5005 that contains a completing vertex, is written as the last vertex pointer 5005 into the read cache 703. The procedures for assembling each of a primitive's vertices from a vertex pointer 5005 is discussed in greater detail above with respect to Table 5 and vertex pointer 5005.

At step 1725, read control 310 sends the packets to the next stage in the graphics pipeline, such as setup 405, on a tile-by-tile basis. At the beginning of outputting each tile's respective image data, an output begin tile packet 9000 is output including all per-tile parameters needed by downstream blocks in a graphics pipeline. Referring to Table 9, there is shown an example of an output begin tile packet 9000 that includes per-tile parameters, such as the location (in pixels) within the 2-D window of the lower left hand corner of the given tile. Referring to Table 9.5, there is shown an example of an output end tile packet 9500. Read control 310 includes the following packets with every tile that is output to the next stage in the graphics pipeline: (1) output cull mode packet 11000; (2) any accumulated clear packets 4000; and, (3) each of the given tile's output primitive packets 13000; and (4) an Output End Tile packet 9500.

OPTIONAL ENHANCEMENTS AND ALTERNATIVE EMBODIMENTS

Line Mode Flags

Recall that each spatial packet 1000 has a LineFlags element 1030. This element 1030 indicates whether a line segment has already been rendered, and thus, does not need to be rendered again. This is particularly important for rendering line mode triangles with shared edges.

Referring to FIG. 16, where there is shown a window 1600 with six tiles A, B, C, D, E and F, and eight geometry primitives 1605, 1610, 1615, 1620, 1625, 1630, 1635 and 1640. In this example, a triangle fan includes triangles 1625, 1630, and 1635. Triangle 1625, identified by vertices 8,9, and 10, share a line segment identified by vertices 8 and 10 with triangle 1630, identified by vertices 8,10 and 11. In this alternate embodiment, if the LineFlag element 1030 is set, such shared line segments will only be rendered once.

Sort Memory: Triple Buffered

With only two pages of sort memory 315, read control 310 and write control 305 are in lockstep and either one of these processes. For example, when the write control 305 is sorting image data for frames that alternate from having complex geometry to having sparse geometry, the read control 310 and write control 305 may operate on significantly different quantities of image data at any one time. Recall that sort memory 315 is swapped when either a complete frame's worth of image data has been processed, a sort memory 315 buffer overflow error occurs, or on a forced end of frame indication sent by an application. Therefore, a process, for example either write control 305 or read control 310, that completes first, has to wait until the other process is complete before it can begin processing a next frame of image data.

Sort Memory: Dynamic Memory Management

In an alternative embodiment of the present invention, sort memory 315 is at least triple buffered. A first, or front buffer is for collecting a scene's geometry. A second, or back buffer is for sending the sorted geometry down the graphics pipeline. A third, or overflow buffer is for storing a frame's geometry when the front buffer has overflowed, or for holding the holds a complete series of spatially sorted image data unitl the back buffer has has finished being emptied. Such an implementation would enable both the read and write process to work relatively independently of one another. For example, frame size stalls on the input side will be isolated from the output side; the only reason write process 200 would stall is if it ran out of memory or data.

In another embodiment, sort memory 315 is managed with a dynamic memory management system, for allocating and deallocating pages of sort memory on an as needed basis. Dynamic memory management systems are known in the art on all non-dedicated hardware platforms. The present invention contemplates use of a dynamic memory manager operating in a processing stage, for example, sort 215, on a dedicated 3-D processor, for example, 3-D processor 117 (see FIGS. 1 and 2).

In one embodiment of the present invention, sort 215 allocates memory blocks from a memory pool, for example, sort memory 315, on an as needed basis. To illustrate this, consider the following example: write control 305 allocates a first memory buffer to sort a frame of image data into. Either at: (a) the end of the image frame; (b) upon receipt, by write control 305, of a forced end of frame indication from a software application executing on, for example, computer 101 (see FIG. 1); or, (c) upon an indication from guaranteed conservative memory estimate 845 (see, FIG. 8) of a possible memory buffer overflow, write control 305 signals read control 310 to begin reading the sorted image data out of the first memory buffer.

At this point, write control 305 allocates a second memory buffer to sort a frame of image data into. Upon happening of any of the above listed events (a), (b), or (c), write control 305 checks to see if read control 310 has completed reading the sorted image data to a subsequent stage pipeline 200. If read control 310 has not finished, write control 305 allocates a third memory buffer to begin sorting a next frame of image data into. Write control 305 additionally, signals read control 310 that the second memory buffer is available for read control 310 to begin reading the sorted image data out of as soon as read control 310 finishes with its current buffer, the first memory buffer.

Upon completion, read control 310 releases the first memory buffer, and returns the memory resource to the memory pool. Additionally, at this point, read control 310 begins to read sorted image data from the second memory buffer. In this manner, write control 305 and read control 310 are able to work relatively independently of one another. Frame size stalls on the input side will be isolated from the output side. Although this example only uses three memory buffers, is contemplated that more than memory buffers can be used.

A Computer Program Product

The present invention can be implemented as a computer program product that includes a computer program mechanism embedded in a computer readable storage medium. For instance, the computer program product would contain the write process and read control program modules shown in FIGS. 8 and 9. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. In a tiled 3-D graphics pipeline, an apparatus for sorting image data, the apparatus being operatively coupled to a previous processing stage of the graphics pipeline and a subsequent processing stage of the graphics pipeline, the apparatus being adapted to read the image data from the previous stage, the image data comprising a set of vertices of a geometric primitive, the apparatus comprising:

a mid-pipeline sorting unit comprising a memory for storing sorted image data, the mid-pipeline sorting unit being adapted to determine if the geometric primitive intersects at least one region of a set of regions that define the area of a 2-D window, and if the geometric primitive intersects a particular region of the set of regions, the mid-pipeline sorting unit being further adapted to store the set of vertices into the memory in a manner that associates each of the geometric primitive's vertices with the particular region, the mid pipeline sorting unit being further adapted to send the sorted image data to the subsequent stage on a region-by-region basis.

2. In a tile based 3-D graphics pipeline, an apparatus for providing a guaranteed conservative memory estimate to a mid-pipeline sorting stage having a memory for storing image data that is sorted with respect to a plurality of regions that define a 2-D window, the mid-pipeline storage unit maintaining a set of memory information used to manage the memory, the system being operatively coupled to the mid-pipelined sorting stage, the apparatus comprising:

a guaranteed conservative memory estimate circuit that is adapted to receive the image data and the memory information from the mid-pipeline sorting unit, the guaranteed conservative memory estimate circuit being further adapted to make a determination of whether there is enough free memory in the memory for the mid-pipeline sorting unit to sort the image data into the memory, the guaranteed conservative memory estimate circuit being further adapted to return the determination to the mid-pipeline sorting unit.

3. In a tile based 3-D graphics pipeline having a plurality of pipeline stages, a mid-pipeline sorting unit comprising:

first means for coupling said mid-pipeline sorting unit to a previous stage;

a memory for storing image data that has been sorted with respect to a set of regions coupled to said first means;

a tile generator circuit coupled to said memory configured to determine a spatially staggered sequence of regions to send to a subsequent pipeline stage; and second means for coupling said mid-pipeline sorting unit to said subsequent stage, said second means coupled to said tile generator circuit.

4. A method for sorting image data in a three-dimensional (3D) graphics pipeline, the 3D graphics pipeline generating a two-dimensional (2D) image from a plurality of geometry primitives, the image data comprising spatial data, mode data, and control data, the spatial data comprising a plurality of vertices, each vertex being associated with at least one of the plurality of the geometry primitives, the method comprising the steps:

(A) receiving one or more sort scissor windows;

(B) receiving the image data;

(C) receiving a signal indicating a programmatically selectable mode of operation for the device, the mode of operation being either a time order mode or a sorted transparency mode, (D) sorting the geometry primitives into a plurality of tiles according to how the geometry primitives overlap the plurality of tiles, each tile comprising an area of the image, considering for the overlap only the tiles within the one or more sort scissor windows in effect at the time the geometry primitive is received, the step of sorting the geometry primitives being done one of two ways depending on the selected mode of operation:

(D1) if the selected mode of operation is time order mode, the performed steps comprise:

(D1a) writing the image data into one or more first memories;

(D1b) generating first pointers, the first pointers each indicating the location of at least one of the geometry primitives in the first memory;

(D1c) generating second pointers, the second pointers each indicating the location of some of the mode data in the first memory;

(D1d) adding each of the first pointers to one or more first pointer lists, the first pointer lists being stored in a second memory; and (D1e) adding each of the second pointers to at least one second pointer list, the second pointer lists being stored in a third memory;

(D2) if the selected mode of operation is sorted transparency mode, the performed steps comprise:

(D2a) storing a plurality of third pointer lists, each third pointer list comprising third pointers to the geometry primitives in the first memory, each third pointer list corresponding to one of the plurality of tiles; and (D2b) adding the third pointer of one of the geometry primitives to one of more of the third pointer lists that correspond to tiles overlapped by the geometry primitive, each third pointer comprising the location of a particular primitive and a flag indicating whether the particular primitive is considered transparent;

(E) selecting tile groups from a plurality of tile groups, in a tile-group-by-tile-group manner, each of the tile groups being an adjacent one or more of the tiles;

(F) selecting the tiles within each of the tile groups, in a tile-by-tile manner; and (G) outputting the geometry primitives that overlap the selected tile in one or more passes:

(G1) if the selected mode of operation is time order mode, the performed steps comprise:

(G1a) for the first pass, sequentially selecting the pointers from the pointer list corresponding to the selected tile and reading from the first memory only the geometry primitives whose corresponding pointer has the flag set to indicate the geometry primitive is not transparent; and (G1b) for subsequent passes, sequentially selecting the pointers from the pointer list corresponding to the selected tile and reading from the first memory only the geometry primitives whose corresponding pointer has the flag set to indicate the geometry primitive is transparent; and (G2) if the selected mode of operation is sorted transparency mode, the performed steps comprise:

(G2a) outputting the geometry primitives that overlap the selected tile within the selected tile group.

5. A device for sorting image data in a three-dimensional (3D) graphics pipeline, the 3D graphics pipeline generating a two-dimensional (2D) image from a plurality of geometry primitives, the device being operatively coupled to a previous stage of the graphics pipeline, and configured to receive the image data from the previous stage, the image data comprising spatial data, mode data, and control data, the spatial data comprising a plurality of vertices, each vertex being associated with at least one of the plurality of the geometry primitives, the device comprising:

one or more first memories storing the image data;

a second memory storing a plurality of first pointer lists, each first pointer list comprising first pointers, the first pointers each indicating the location of at least one of the geometry primitives in the first memory;

a third memory storing at least one second pointer list, each second pointer list comprising second pointers, the second pointers each indicating the location of some of the mode data in the first memory;

logic determining, for at least some of the geometry primitives, the tiles touched by the geometry primitives, the tiles each being associated with at least one of the first pointer lists; and, a write control coupled to the previous stage, the first memory, the second memory, and the third memory, the write control comprising:

logic receiving the image data from the previous stage;

logic writing the image data into the first memories;

logic generating the first pointers and the second pointers; and logic writing the first pointers into the second memory and the second pointers into the third memory.

6. The device of claim 5, wherein an area of the generated 2D image comprises a plurality of tiles, the write control further comprising:

logic determining, for each of the first pointers, the first pointer lists to which the first pointer is added, the adding being based on which tiles are touched by the geometry primitive corresponding to the first pointer.

7. The device of claim 6, wherein the first memories store the image data in an order corresponding to a sequence in which the image data is received, thereby causing the first pointers and the second pointers to form a set of pointers that are sequentially related.

8. The device of claim 6, wherein a single memory comprises the first memories, the second memory, and the third memory.

9. The device of claim 6, wherein the write control further comprising:

logic estimating a bounding box that circumscribes a selected one of the geometry primitives before the tiles touched by the selected geometry primitive are determined; and the logic determining the tiles touched by the geometry primitives further comprising logic testing only the tiles overlapped by the bounding box to be the tiles touched by the selected geometry primitive.

10. The device of claim 6, wherein the first pointer comprises:

a location of a particular one of the vertices of the corresponding geometry primitive; and an offset from the particular vertex to the location of another one of the vertices associated with the corresponding geometry primitive.

11. The device of claim 10, wherein the particular vertex is a completing vertex of the corresponding geometry primitive.

12. The device of claim 10, wherein the first pointer further comprises a plurality of line flags.

13. The device as in claim 7, wherein the device further comprises:

a read control coupled to the first memories, the second memory, and the third memory, the read control comprising:

logic selecting one of the first pointer lists;

logic reading the selected first pointer list from the second memory;

logic using the first pointers in the read first pointer list to read the geometry primitives from the first memories; and logic outputting the read geometry primitives to a next stage of the 3D graphics processor.

14. The device of claim 6, wherein the device further comprises:

the logic writing the image data into the first memory further comprising logic writing the received image data in an order the image data is received, thereby writing the geometry primitives and mode data in the received order;

a read control coupled to the first memories, the second memory, and the third memory, the read control comprising:

logic selecting one of the tiles, the selected tile corresponding to a selected first pointer list, the selected first pointer list being one of the first pointer lists;

logic reading the selected first pointer list from the second memory;

logic reading the at least one second pointer list from the third memory;

logic using the first pointers in the read first pointer list to read the geometry primitives from the first memories;

logic using the second pointers in the read second pointer list to read the mode data from the first memories; and output logic determining a sequence of outputting the read geometry primitives and the read mode data so as to preserve the received order of the read geometry primitives and the read mode data for the selected tile.

15. A sorting device configured to reconstruct the received order of data objects after the data objects have been sorted into a plurality of sort lists, the device comprising:

(1) a linear list memory storing the data objects in the order in which the data objects are received;

(2) a plurality of pointer memories, each pointer memory storing one of the sort lists, each of a plurality of entries in the sort list being at least part of an address into the linear list memory, the address being the location of one of the data objects in the linear list memory;

(3) a writing control comprising:

(3a) logic receiving one of the data objects;

(3b) logic writing the received data object into the linear list memory at a next available address, the next available address being numerically greater than addresses used for writing previously received data objects; and (3c) sort logic sorting the received data object into one or more of the sort lists out of the plurality of sort lists, the sorting being done according to a sorting rule, the received data object being added to any one of the sort lists by appending at least part of the received object's address in linear list memory to the end of the sort list; and (4) a read control comprising:

(4a) logic selecting a subset of the plurality of sort lists;

(4b) logic maintaining a set of next addresses, each one of the next addresses being from a corresponding one of the sort lists in the subset of sort lists;

(4c) logic comparing the next addresses to each other to determine which of the next addresses is a numerically smallest address;

(4d) logic using the numerically smallest address to read one of the data objects from the linear list memory; and (4e) logic replacing the numerically smallest address in the set of next addresses with a next sequential one of the addresses from the same sort list as the numerically smallest address.

16. The sorting device of claim 15 the device further comprising:

a sort memory comprising the plurality of pointer memories, the sort memory being dynamically allocated to sort lists on an as-needed basis; and the sort logic further comprising:

logic allocating a data record in the sort memory, the data record comprising: (a) one or more of the at least part of the addresses of the object addresses into the linear list memory; and (b) a link pointer to another data record; and logic constructing a linked list for each of the sort lists, the linked list being none, one, or more of the data records.

17. A method of reconstructing the received order of objects after the objects have been sorted into a plurality of sort lists, the method comprising the steps:

(1) a list writing procedure comprising the steps:

(1a) receiving one of the objects;

(1b) adding the received object to a linear list of a multiplicity of previously received objects, the received object being located at an address in the linear list such that the address is numerically greater than the addresses locating the multiplicity of previously received objects;

(1c) sorting the received object into one or more sort lists out of the plurality of sort lists, the sorting being done in accordance with a sorting rule, the received object being added to any one of the sort lists by appending the received object's address to the end of the sort list; and (2) a list reading procedure comprising the steps:

(2a) selecting a subset of the plurality of sort lists;

(2b) maintaining a set of next addresses, each one of the next addresses being from a corresponding one of the sort lists in the subset of sort lists;

(2c) comparing the next addresses to each other to determine which of the next addresses is a numerically smallest address;

(2d) using the numerically smallest address to read one of the objects from the linear list; and (2e) replacing the numerically smallest address in the set of next addresses with a next sequential one of the addresses from the same sort list as the numerically smallest address.

18. A method for sorting image data in a three-dimensional (3D) graphics pipeline, the 3D graphics pipeline generating a two-dimensional (2D) image from a plurality of geometry primitives, the image data comprising spatial data, mode data, and control data, the spatial data comprising a plurality of vertices, each vertex being associated with at least one of the plurality of the geometry primitives, the method comprising the steps:

receiving the image data;

writing the image data into one or more first memories;

generating first pointers, the first pointers each indicating the location of at least one of the geometry primitives in the first memory;

generating second pointers, the second pointers each indicating the location of some of the mode data in the first memory;

adding each of the first pointers to one or more first pointer lists, the first pointer lists being stored in a second memory;

adding each of the second pointers to at least one second pointer list, the second pointer lists being stored in a third memory;

dividing the image area into a plurality of tiles; and determining, for at least some of the geometry primitives, the tiles touched by the geometry primitives, the tiles each being associated with at least one of the first pointer lists.

19. The method of claim 18, further comprising the steps:

determining, for each of the first pointers, the first pointer lists to which the first pointer is added, the adding being based on which tiles are touched by the geometry primitive corresponding to the first pointer.

20. The method of claim 19, wherein the step of writing the image data stores the image data into the first memory in an order corresponding to a sequence in which the image data is received, thereby causing the first pointers and the second pointers to form a set of pointers that are sequentially related.

21. The method of claim 19, further comprising the steps:

estimating a bounding box that circumscribes a selected one of the geometry primitives before the tiles touched by the selected geometry primitive are determined; and determining the tiles touched by the geometry primitives by testing only the tiles overlapped by the bounding box to be the tiles touched by the selected geometry primitive.

22. A device for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the device comprising:

a first memory storing the image data;

a second memory storing a plurality of pointer lists, each pointer list comprising locations of the geometry primitives in the first memory, each pointer list corresponding to one of a plurality of tiles, each tile comprising an area of the image;

logic adding the location of one of the geometry primitives to one of more of the pointer lists that correspond to tiles overlapped by the geometry primitive;

tile group logic selecting tile groups from a plurality of tile groups, in a tile-group-by-tile-group manner, each of the tile groups being an adjacent one or more of the tiles;

logic selecting tiles within each of the tile groups, in a tile-by-tile manner; and logic outputting the geometry primitives that overlap the selected tile within the selected tile group.

23. A method for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the method comprising the steps:

sorting the geometry primitives according to how the geometry primitives overlap a plurality of tiles, each tile comprising an area of the image;

selecting tile groups from a plurality of tile groups, in a tile-group-by-tile-group manner, each of the tile groups being an adjacent one or more of the tiles;

selecting tiles within each of the tile groups, in a tile-by-tile manner; and outputting the geometry primitives that overlap the selected tile within the selected tile group.

24. The method of claim 23, further comprising the step:

selecting a next selected tile group using the selected tile group and the rule:

$$T_{n+1} = \mathrm{mod}_N(T_n + M)$$

where N=a number used in the modular arithmetic, M=a programmatically selectable step size, $T_n$=a designator of the selected tile group, and $T_{n+1}$=a designator of the next selected tile group.

25. A method for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the method comprising the steps:

receiving one or more sort scissor windows;

sorting the geometry primitives into a plurality of tiles according to how the geometry primitives overlap the plurality of tiles, each tile comprising an area of the image, considering for the overlap only the tiles within the one or more sort scissor windows in effect at the time the geometry primitive is received;

selecting tiles from the plurality of tiles, in a tile-by-tile manner; and outputting the geometry primitives that are sorted into the selected tile.

26. A method for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the method comprising the steps:

receiving one or more first sort scissor windows;

associating each of the first sort scissor windows with one of a first subset of the geometry primitives;

sorting the geometry primitives into a plurality of tiles according to how the geometry primitives overlap the plurality of tiles, each tile comprising an area of the image;

selecting tiles from the plurality of tiles, in a tile-by-tile manner; and outputting the geometry primitives that are sorted into the selected tile, but omitting from the output any considered one of the primitives not inside at least one of the first sort scissor windows having the association with the considered primitive.

27. A device for sorting image data in a three-dimensional (3D) graphics pipeline, the 3D graphics pipeline generating a two-dimensional (2D) image from a plurality of geometry primitives, the image data comprising a plurality of vertices, each-vertex being associated with at least one of the plurality of the geometry primitives, the device comprising:

a first memory storing one or more sort scissor windows;

a second memory storing sorted geometry primitives, the geometry primitives sorted into a plurality of tiles according to how the geometry primitives overlap the plurality of tiles, each tile comprising an area of the image, considering for the overlap only the tiles within the one or more sort scissor windows in effect at the time the geometry primitive is received;

logic selecting tiles from the plurality of tiles, in a tile-by-tile manner; and logic outputting the geometry primitives that are sorted into the selected tile.

28. A device for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the device comprising:

a first memory storing one or more first sort scissor windows, a first association associating each of the first sort scissor windows with one of a first subset of the geometry primitives;

a second memory storing sorted geometry primitives, the geometry primitives sorted into a plurality of tiles according to how the geometry primitives overlap the plurality of tiles, each tile comprising an area of the image;

logic selecting tiles from the plurality of tiles, in a tile-by-tile manner; and output logic outputting the geometry primitives that are sorted into the selected tile, but omitting from the output any considered one of the primitives not inside at least one of the first sort scissor windows having the first association with the considered primitive.

29. A device for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the device comprising:

a first memory storing the image data;

a second memory storing a plurality of pointer lists, each pointer list comprising pointers to the geometry primitives in the first memory, each pointer list corresponding to one of a plurality of tiles, each tile comprising an area of the image;

logic adding the pointer of one of the geometry primitives to one of more of the pointer lists that correspond to tiles overlapped by the geometry primitive, each pointer comprising the location of a particular primitive and a flag indicating whether the particular primitive is considered transparent;

tile group logic selecting tile groups from a plurality of tile groups, in a tile-group-by-tile-group manner, each of the tile groups being an adjacent one or more of the tiles;

logic selecting a current tile from the plurality of tiles; and read logic outputting the geometry primitives that overlap the selected tile in one or more passes:

for the first pass, the read logic sequentially selects the pointers from the pointer list corresponding to the selected tile and reads from the first memory only the geometry primitives whose corresponding pointer has the flag set to indicate the geometry primitive is not transparent; and for subsequent passes, the read logic sequentially selects the pointers from the pointer list corresponding to the selected tile and reads from the first memory only the geometry primitives whose corresponding pointer has the flag set to indicate the geometry primitive is transparent.

30. A method for sorting image data in a three-dimensional (3D) graphics pipeline, the 3D graphics pipeline generating a two-dimensional (2D) image from a plurality of geometry primitives, the image data comprising a plurality of vertices, each vertex being associated with at least one of the plurality of the geometry primitives, the method comprising the steps:

storing the image data in a first memory;

storing a plurality of pointer lists, each pointer list comprising pointers to the geometry primitives in the first memory, each pointer list corresponding to one of a plurality of tiles, each tile comprising an area of the image;

adding the pointer of one of the geometry primitives to one of more of the pointer lists that correspond to tiles overlapped by the geometry primitive, each pointer comprising the location of a particular primitive and a flag indicating whether the particular primitive is considered transparent;

selecting a current tile from the plurality of tiles; and outputting the geometry primitives that overlap the selected tile in one or more passes:

for the first pass, sequentially selecting the pointers from the pointer list corresponding to the selected tile and reading from the first memory only the geometry primitives whose corresponding pointer has the flag set to indicate the geometry primitive is not transparent; and for subsequent passes, sequentially selecting the pointers from the pointer list corresponding to the selected tile and reading from the first memory only the geometry primitives whose corresponding pointer has the flag set to indicate the geometry primitive is transparent.

31. In a tiled 3-D graphics pipeline, an apparatus for sorting image data, the apparatus being operatively coupled to a previous processing stage of the graphics pipeline and a subsequent processing stage of the graphics pipeline, the apparatus being adapted to read the image data from the previous stage, the image data comprising a set of vertices of a geometric primitive, the apparatus comprising:

a mid-pipeline sorting unit configured to spatially sort the image data from the previous stage after the primitive data has been transformed to screen coordinates, but before the end of the graphics pipeline, such that only image data representing potentially visible portions of a window are sent to subsequent processing stages.

32. A method for sorting image data in a three-dimensional (3D) graphics pipeline, the 3D graphics pipeline generating a two-dimensional (2D) image from a plurality of geometry primitives, the image data comprising spatial data, mode data, and control data, the spatial data comprising a plurality of vertices, each vertex being associated with at least one of the plurality of the geometry primitives, the method comprising:

receiving the image data after the spatial data has been transformed to screen coordinates, but before the end of the graphics pipeline;

sorting said image data according to regions of the 2D image; and outputting said image data on a region-by-region basis such that only image data representing potentially visible portions of the 2D image are sent to subsequent processing stages.

* * * * *